US011490615B2

(12) United States Patent
Kravitz et al.

(10) Patent No.: US 11,490,615 B2
(45) Date of Patent: Nov. 8, 2022

(54) ASSESSING, MAINTAINING AND/OR RESTORING VIABILITY OF ORGANS/TISSUES

(75) Inventors: David Kravitz, Barrington Hills, IL (US); Kelvin G. M. Brockbank, Charleston, SC (US); Lia H. Campbell, Mount Pleasant, SC (US)

(73) Assignee: LIFELINE SCIENTIFIC, INC., Itasca, IL (US)

( * ) Notice: Subject to any disclaimer, the term of this patent is extended or adjusted under 35 U.S.C. 154(b) by 0 days.

(21) Appl. No.: 13/490,852

(22) Filed: Jun. 7, 2012

(65) Prior Publication Data
US 2012/0315618 A1 Dec. 13, 2012

Related U.S. Application Data

(60) Provisional application No. 61/495,088, filed on Jun. 9, 2011.

(51) Int. Cl.
A01N 1/02 (2006.01)
(52) U.S. Cl.
CPC .................................. A01N 1/0247 (2013.01)
(58) Field of Classification Search
None
See application file for complete search history.

(56) References Cited

U.S. PATENT DOCUMENTS

| 3,521,743 | A | 7/1970 | Sposito |
| 3,712,583 | A | 1/1973 | Martindale et al. |
| 3,845,974 | A | 11/1974 | Pelloux-Gervais |
| 3,881,990 | A | 5/1975 | Burton et al. |
| 5,013,303 | A | 5/1991 | Tamari et al. |
| 5,051,352 | A | 9/1991 | Martindale et al. |
| 5,149,321 | A | 9/1992 | Klatz et al. |
| 5,286,718 | A | 2/1994 | Elliott |
| 5,395,314 | A | 3/1995 | Klatz et al. |
| 5,405,742 | A | 4/1995 | Taylor |
| 5,451,524 | A | 9/1995 | Coble et al. |
| 5,476,763 | A * | 12/1995 | Bacchi et al. ............. 435/284.1 |
| 5,514,536 | A | 5/1996 | Taylor |
| 5,584,804 | A | 12/1996 | Klatz et al. |
| 5,585,399 | A | 12/1996 | Hong et al. |
| 5,599,659 | A | 2/1997 | Brasile et al. |
| 5,643,712 | A | 7/1997 | Brasile |
| 5,699,793 | A | 12/1997 | Brasile |
| 5,702,881 | A | 12/1997 | Brasile et al. |
| 5,709,654 | A | 1/1998 | Klatz et al. |
| 5,743,267 | A * | 4/1998 | Nikolic et al. ................ 600/483 |
| 5,752,929 | A | 5/1998 | Klatz et al. |
| 5,843,024 | A | 12/1998 | Brasile |
| 5,879,329 | A | 3/1999 | Ginsburg |
| 5,894,266 | A * | 4/1999 | Wood et al. ............. 340/539.17 |
| 5,928,182 | A | 7/1999 | Kraus et al. |
| 6,046,046 | A | 4/2000 | Hassanein |
| 6,238,908 | B1 | 5/2001 | Armstrong et al. |
| 6,300,875 | B1 | 10/2001 | Schafer |
| 6,492,103 | B1 | 12/2002 | Taylor |
| 6,642,045 | B1 | 11/2003 | Brasile |
| 6,673,594 | B1 | 1/2004 | Owen et al. |
| 6,994,954 | B2 | 2/2006 | Taylor |
| 7,045,279 | B1 | 5/2006 | Laske et al. |
| 7,560,486 | B2 | 7/2009 | Carpentier et al. |
| 8,318,415 | B2 * | 11/2012 | Owen et al. ................... 435/1.2 |
| 2002/0051779 | A1 * | 5/2002 | Gage ........................ A01N 1/02 424/94.64 |
| 2002/0094949 | A1 | 7/2002 | Paquin et al. |
| 2004/0038891 | A1 | 2/2004 | Bisgaier et al. |
| 2004/0224298 | A1 | 11/2004 | Brassil et al. |
| 2005/0153271 | A1 * | 7/2005 | Wenrich ........................ 435/1.1 |
| 2006/0166182 | A1 | 7/2006 | Weinberg et al. |
| 2010/0330547 | A1 | 12/2010 | Tempelman et al. |

FOREIGN PATENT DOCUMENTS

| JP | 2004-513889 A | 5/2004 |
| JP | 2004-529938 A | 9/2004 |
| JP | 2007-519763 A | 7/2007 |
| JP | 2007-295802 A | 11/2007 |
| JP | 2008-519830 A | 6/2008 |
| JP | 2010-520207 A | 6/2010 |

OTHER PUBLICATIONS

Dutkowski et al. Ann Surg, 2006, 244: 968-977.*
Taylor et al. Cryobiology 60 (2010) S20-S35.*
Jochmans, Ina et al., "Graft Quality Assessment in Kidney Transplantation: Not An Exact Science Yet!" Current Opinion in Organ Transplantation, Apr. 2011, pp. 174-179, vol. 16, No. 2, Lippencott Williams & Wilkins.
Moers, Cyril et al., "The Value of Machine Perfusion Perfusate Biomarkers for Predicting Kidney Transplant Outcome," Transplantation, Nov. 2010, pp. 966-973, vol. 90, No. 9, Lippincott Williams & Wilkins.
Mar. 16, 2016 Decision to Grant a Patent issued in Japanese Application No. 2014-514621.
Oct. 20, 2015 Office Action issued in Japanese Application No. 2014-514621.
Mar. 20, 2015 Office Action issued in Japanese Application No. 2014-514621.

(Continued)

Primary Examiner — Michael L Borin
(74) Attorney, Agent, or Firm — Oliff PLC

(57) ABSTRACT

Methods for ex vivo perfusion of organs (and/or tissues) with a perfusate designed to condition the organ with the desired effect being that upon transplant, said organ, having been administered said perfusate, is less likely to experience delayed graft function, deleterious effects of ischemia/reperfusion injury, including inflammatory reactions, and/or other detrimental responses that can injure the organ or recipient including precipitating or enhancing an immunological reaction from the recipient with the potential of compromising the graft's and/or recipients short teen and/or long term health and proper functionality while monitoring, sustaining and/or restoring the viability of the organ and preserving the organ for storage and/or transport.

3 Claims, 5 Drawing Sheets

(56) References Cited

OTHER PUBLICATIONS

Mar. 29, 2018 Examiner's Report issued in Canada Patent Application No. 2,838,537.
Oct. 8, 2013 PCT International Preliminary Report on Patentability issued in International Application No. PCT/US2012/041257.
Sep. 28, 2012 International Search Report issued in PCT/US2012/041257.
Sep. 28, 2012 Written Opinion issued in PCT/US2012/041257.

\* cited by examiner

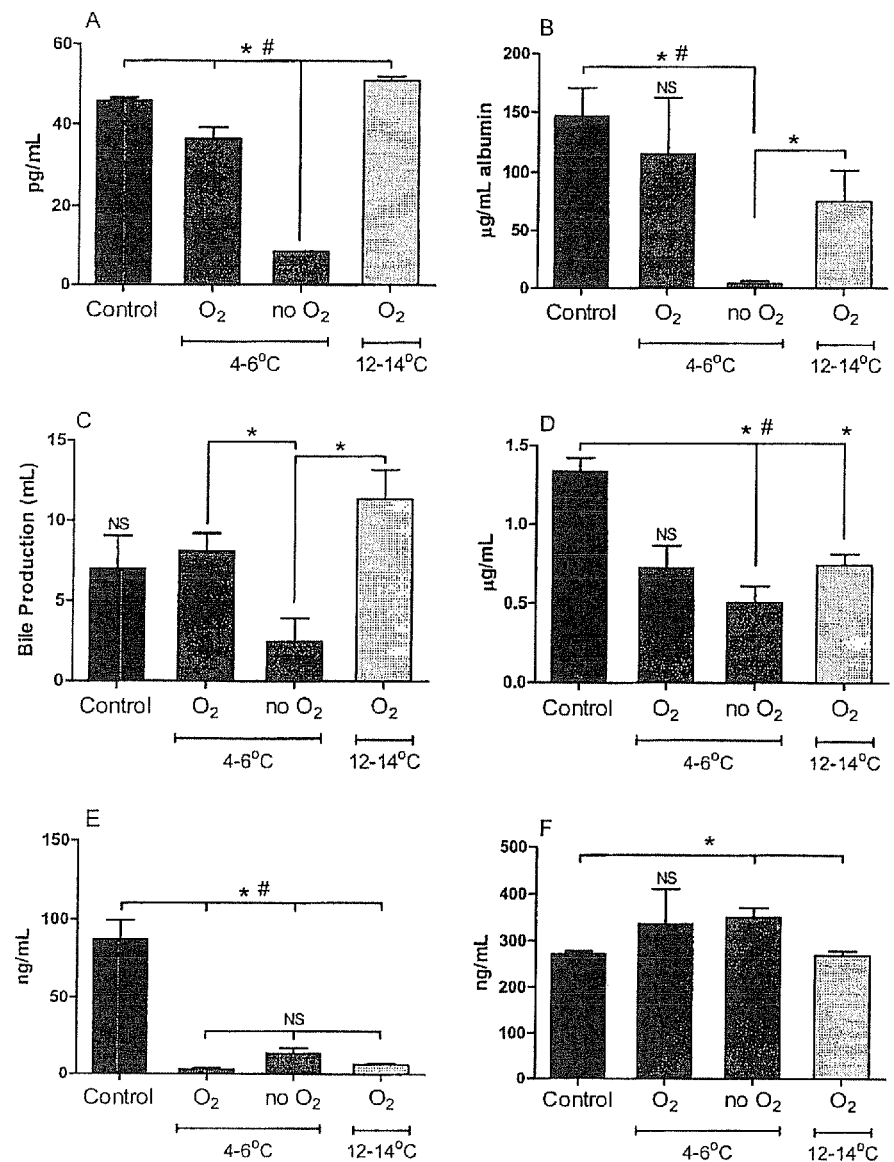
FIG. 5A-F

ASSESSING, MAINTAINING AND/OR RESTORING VIABILITY OF ORGANS/TISSUES

CROSS-REFERENCE TO RELATED APPLICATION

This nonprovisional application claims the benefit of U.S. Provisional Application No. 61/495,088 filed Jun. 9, 2011. The disclosure of the prior application is hereby incorporated by reference in its entirety.

BACKGROUND OF THE INVENTION

Field of Invention

This disclosure relates to methods for perfusing one or more organs to monitor, sustain and/or restore the viability of the organ(s) and/or for transporting and/or storing the organ(s). This disclosure particularly relates to processes and compositions for organ and tissue preservation and may include methods for perfusing one or more organs, tissues or the like (hereinafter "organs") with a composition to sustain, maintain or improve the viability of the organs before and/or during transplantation.

Description of Related Art

Hypothermia is the bedrock of all useful methods of organ and tissue preservation, and has proven to be most effectively applied by controlling the extracellular environment of cells directly, and the intracellular environment indirectly, during cold exposure. Conventional control of the extracellular environment of cells to optimize preservation is based upon different strategies that include either static cold storage (or flush preservation), or low temperature continuous perfusion. These strategies call for different approaches to interventional control of the extracellular environment in order to optimize preservation, and hence different design elements for the solutions used to implement these strategies.

One such strategy for interventional control is the preservation of organs by machine perfusion, which has been accomplished at various temperatures either with or without computer control. See, for example, U.S. Pat. Nos. 5,149, 321, 5,395,314, 5,584,804, 5,709,654 and 5,752,929, which are hereby incorporated by reference. Available techniques used for assessment of the viability of the machine perfused organs have been a critical factor in limiting the organs from greater use.

However, such machine preservation methods offer significant improvements over conventional methods, such as cold flush storage or preservation, that are solely based upon the premise that temperature reduction to near but not below the ice point (0° C.) precludes the need to support metabolism to any significant extent, and that the correct distribution of water and ions between the intracellular and extracellular compartments can be maintained by physical rather than metabolic means. Such conventional methods merely attempt to prevent or restrict cellular changes by manipulating the extracellular environment to abolish chemical potential gradients by use of variety of flush, or organ washout, solutions, often referred to as "intracellular" solutions due to their resemblance, in some respects, to intracellular fluid.

With due consideration for the effects of ischemia, reperfusion, hypoxia, and hypothermia injury on cells, coupled with the proven efficacy of various existing organ preservation solutions, a number of important characteristics in the design of storage solutions has emerged. These include, for example, minimizing of hypothermically induced cell swelling; preventing expansion of the interstitial space (especially important during perfusion); restricting ionic imbalances; preventing intracellular acidosis; preventing injury from free radicals; providing substrates for regeneration of high energy phosphate compounds during reperfusion; among others. The present disclosure improves upon known methods by introducing methodology for improving the strategies and approaches to interventional control of the extracellular environment by monitoring one or more predetermined biomarkers (which may be chemicals, such as a chemical or substance indicative of injury, damage and/or healthy operation of a donor organ) of one or more of an organ to be transplanted.

SUMMARY OF THE INVENTION

The present disclosure is directed to perfusion (such as ex vivo perfusion) of organs (and/or tissues) with a perfusate designed to condition the organ with the desired effect being that upon transplant, said organ, having been administered said perfusate, is less likely to experience delayed graft function, deleterious effects of ischemia/reperfusion injury, including inflammatory reactions, and/or other detrimental responses that can injure the organ or recipient.

The present disclosure provides for the formation of a data record by uploading to a processor compiled data comprising: data relating to (1) one or more qualitative and/or quantitative relationships of one or more predetermined biomarkers while organs were preserved, transported and/or stored in at least one device selected from an organ transporter, perfusion apparatus, cassette, and organ diagnostic apparatus, and (2) events and/or conditions occurring while organs were transported and/or stored in at least one device selected from an organ transporter, perfusion apparatus, cassette, and organ diagnostic apparatus, and data relating to outcomes of transplantation of said organs; and using the same processor or a different processor to determine preservation conditions (including sustaining and/or restoring the viability of the organ) and/or transport parameters of the at least one device or a different device, based on the data record, for maintaining viability of at least one other organ.

The present disclosure is also directed to methods of monitoring, maintaining, and/or restoring viability of at least one organ in at least one device selected from an organ transporter, perfusion apparatus, cassette, and organ diagnostic apparatus, the method comprising: monitoring data comprising information relating to (1) one or more qualitative and/or quantitative relationship of one or more predetermined biomarkers while organs were transported and/or stored in at least one device selected from an organ transporter, perfusion apparatus, cassette, and organ diagnostic apparatus, and (2) events and/or conditions occurring while at least one organ is present in at least one of an organ transporter, perfusion apparatus, cassette, and/or organ diagnostic apparatus to form a data record; and connecting the at least one of the organ transporter, perfusion apparatus, cassette, and/or organ diagnostic apparatus to a network through wiring or wirelessly, and uploading the data record to a database.

The present disclosure also describes, methods of transporting, preserving, and/or storing at least one organ in at least one device selected from an organ transporter, perfusion apparatus, cassette, and/or organ diagnostic apparatus, the method comprising: adjusting preservation (which may include sustaining and/or restoring the viability of the organ), transport and/or storage parameters of at least one device for the transport and/or storage of at least one organ based (at least in-part) on a data record of organ preservation, transport and/or storage, the data record comprising: information relating to (1) qualitative and/or quantitative relationship of one or more predetermined biomarkers monitored while at least one same or different organ was preserved, transported and/or stored in at least one device selected from an organ transporter, perfusion apparatus, cassette, and organ diagnostic apparatus, and (2) events occurring while at least one same or different organ was transported and/or stored in a least one same or different device, wherein the information is cross-referenced to outcome data relating to outcomes of transplantation of the at least one same or different organ that was transported and/or stored.

The disclosure is also directed to methods for perfusing an organ to monitor, sustain and/or restore the viability of the organ and/or for transporting and/or storing the organ. More particularly, the method according to the present disclosure monitor, sustain and/or restore organ viability by perfusing the organ at hypothermic temperature (hypothermic perfusion mode), mid-normothermic temperatures, near-normothermic temperatures, normothermic temperatures (normothermic perfusion mode), predetermined intervals of one or more (or two or more) of the aforementioned perfusion modes, and/or selection of one or more of the above perfusion temperatures in response to the detection of one or more predetermined biomarkers (and/or the presence of a predetermined qualitative and/or quantitative relationship of one or more of the predetermined biomarkers).

BRIEF DESCRIPTION OF THE DRAWINGS

These and other aspects and advantages of the present disclosure will become apparent from the following detailed description of embodiments when taken in conjunction with the accompanying drawings, in which:

FIG. 5A-F are illustrations of ex vivo test results for samples collected after 3 hours of normothermic perfusion for fresh control livers (red), 12 hours of 4-6° C. HMP livers±$O_2$ Assays and 12 hours of 12-14° C. livers with $O_2$. A) shows IL-8, B) albumin, C) total bile production, D) β-galactosidase, E) TNF-α and F) LDH. The data is expressed as the mean 1 se of 4 livers in each experimental group and of 6 control livers, * and # indicates p<0.05 by t-test and 1 way ANOVA, respectively.

DETAILED DESCRIPTION

Figure 1:
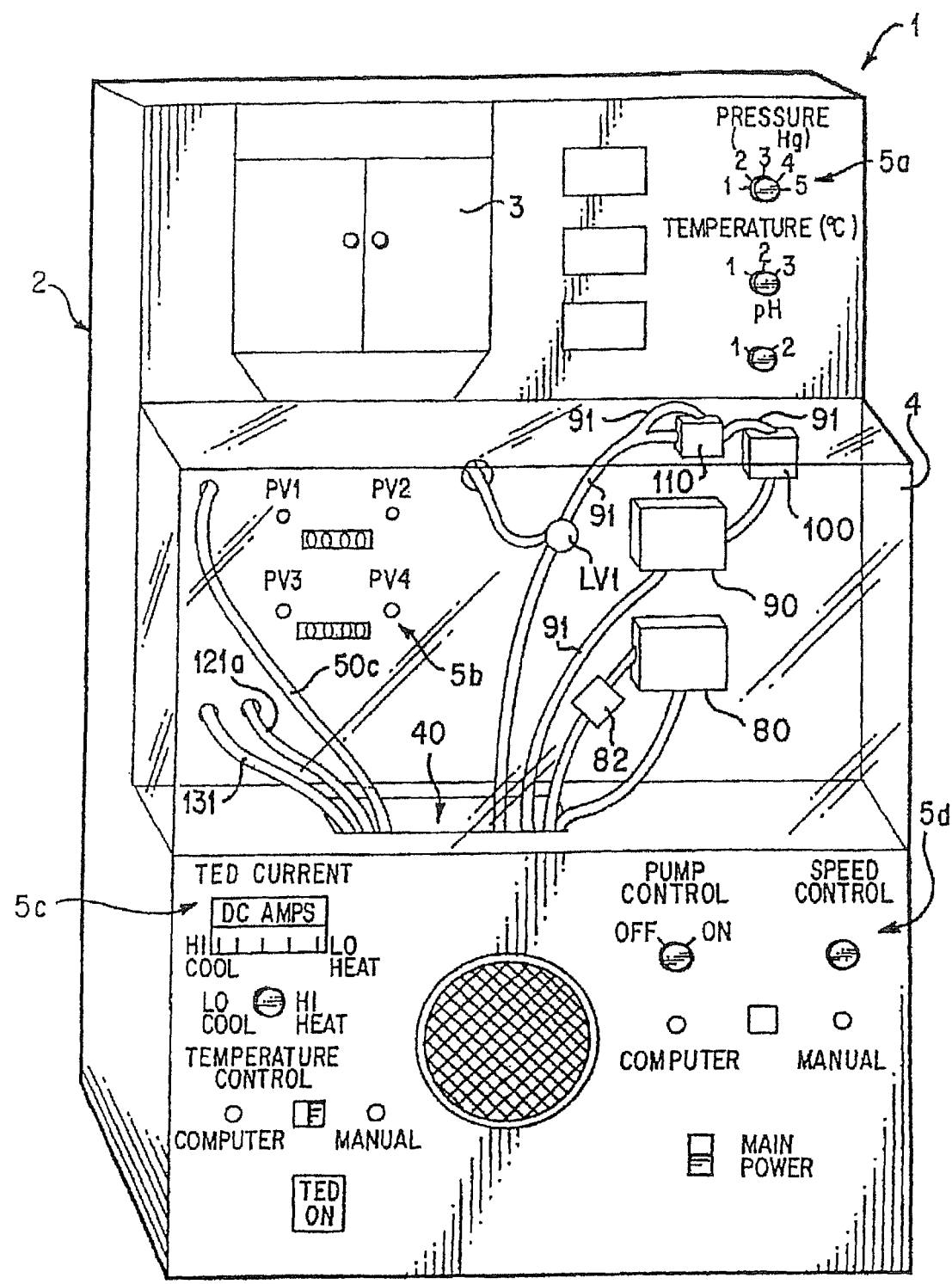
FIG. 1 is an organ perfusion apparatus according to the invention.

The present disclosure is directed to methodology for improving the strategies and approaches to interventional control of the extracellular environment (and indirectly the intracellular environment) by selecting and monitoring predetermined biomarkers that may be present in an organ to be transplanted, such as while the organ is being preserved by machine perfusion, and either comparing and/or correlating that data with transplant outcomes (or collecting that data in order to compare with future transplant outcomes) in order to optimize preservation, and sustain, maintain or improve the viability of the organs before and/or during transplantation.

The methods of the present disclosure will also for an increased availability and quality of donor organs for transplantation leading to more patients receiving transplants with better clinical outcomes. The methods of the present disclosure accomplish this by use of a clinically usable, portable machine perfusion device and methods of organ preservation that reliably preserve human organs for up to 24 hours. In addition to increasing the availability and quality of donor organs, the methods of the present disclosure along with the increased storage times that occur by from the use of the methods of the present disclosure may permit transport over longer distances to recipients that are better matched to the donation resulting in improved recipient outcomes.

The methods of the present disclosure improve upon known methodology for assessment of the viability of machine perfused organs by monitoring the organ, optionally while being treated and/or preserved via machine perfusion, for specific biomarkers, which may include perfused small molecule, large molecule (biochemical and pharmacological components) and/or biological substances. In embodiments, the assessment occurs, for example, at various ex vivo predetermined pump time intervals (such as continuous or every 5, 10, 15 or 30 minutes, hourly and/or daily). In embodiments, the methods of the present disclosure may be employed to ensure the biomarkers full and complete distribution throughout the organ and/or of the organ's acceptance of the compound or effect thereof, at cellular or sub cellular levels.

The present disclosure also describes further improvements of perfusion preservation methods and solutions by inclusion of small molecules, large molecules and/or biological substances (which may be a predetermined biomarker for the respective organ and/or influence a predetermined biomarker) designed to condition an organ (ex vivo) in a manner so as to deliver a distribution of said small molecules, large molecules and/or biological substances throughout the organ with the desired effect being that upon transplant, said organ, having been administered said small molecules, large molecules and/or biological substances, is less likely to experience delayed graft function, deleterious effects of ischemia/re perfusion injury, including inflammatory reactions, and/or other detrimental responses that can injure the organ or recipient including precipitating or enhancing an immunological reaction from the recipient with the potential of compromising the graft's and/or recipients short term and/or long term health and proper functionality. In embodiments, the inclusion of such small molecules, large molecules and/or biological substances in the perfusion solutions may be effective in attenuating, avoiding, and/or counteracting various destructive pathways, such as destructive pathways, such as destructive pathways brought about by the deleterious effects of ischemia and reperfusion injury.

In the methods of the present disclosure, the organs may be held at one or more temperature for a predetermined amount of time in order to optimize the process of sustaining, maintaining or improving the viability of the organs before and/or during transplantation. For example, a method of the present disclosure using predominately hypothermic temperatures may be employed for an organ or tissue that has been evaluated and exceeds a predetermined threshold viability index, to provide a decrease in organ metabolism, lower the energy requirements, delay the depletion of high energy phosphate reserves and accumulation of lactic acid and retard the morphological and functional deterioration associated with disruption of blood supply. Alternatively, a method for a particular organ may be selected that first employs mid-normothermic to normothermic temperatures to improve the viability of the organ and/or tissue until an organ and/or tissue meeting a predetermined threshold viability index is obtained (which may vary from organ to organ), thereafter hypothermic temperatures may be employed to provide a decrease in organ metabolism, lower the energy requirements, delay the depletion of high energy phosphate reserves and accumulation of lactic acid and retard the morphological and functional deterioration associated with disruption of blood supply.

The methods of the present disclosure may maintain and/or restore organ viability in a variety of ways, such as by restoring high energy nucleotide (e.g., adenosine triphosphate (ATP)) levels and enzyme levels in the organ, which were reduced by warm ischemia time and/or hypoxia, by perfusing the organ with an oxygenated medical fluid, at hypothermic, normothermic, mid-normothermic or near-normothermic temperatures. The optimum perfusate regimen/therapy and/or temperature mode for maintaining, restoring, and improving the organ viability in order to meet a predetermined threshold viability index may vary from organ to organ, and may depend on the condition or state the donor organ was received in (e.g., differences include heart-beating donors versus non-heart beating donors and amount of time the organ has been out of the body).

The present disclosure is also directed to collecting data comprising information relating to (1) one or more qualitative and/or quantitative relationship (which may be relationships like the presence or absence of a biomarker with or without the presence of another biomarker, or the a ratio of the level of one or more biomarkers to one or more other biomarker(s), such as a quantity ratio of one or more biomarkers with respect one or more other biomarkers, for example, a concentration ratio) of one or more predetermined biomarkers (this data may or may not include the relationship of one or more or the predetermined biomarkers to a perfusion parameter or condition, such as temperature, perfusion pressure, etc.) while organs were transported and/or stored in at least one device selected from an organ transporter, perfusion apparatus, cassette, and organ diagnostic apparatus, and (2) events and/or conditions occurring while at least one organ is present in at least one of an organ transporter, perfusion apparatus, cassette, and/or organ diagnostic apparatus to form a data record. Such data may be used to populate and/or create a database of information that may be subsequently used as a basis for adjusting preservation (including sustaining and/or restoring the viability of the organ), transport and/or storage parameters of at least one device for the transport and/or storage of at least one organ.

In embodiments, the data used as a basis for adjusting preservation (including sustaining and/or restoring the viability of the organ), transport and/or storage parameters originates from data previously recorded data acquired for an identical donor organ whose transplant outcome has been correlated with the data obtained during that organ's preservation, transport and/or storage.

In embodiments, the information in the data record may be used to select one or more biomarkers and if applicable, determine optimum concentration ranges for the one or more biomarkers. Then, once the donor organ is acquired and an the predetermined biomarkers of the organ are assessed, the most effective restoration and preservation procedures for the donor organ may be determined on the basis of information contained in the data record. For example, depending on the initial detected predetermined biomarkers, a determination may be made as to what the initial preservation strategy would be most beneficial to sustain or improve the viability of the organ; for example, whether the organ should be immediately flushed with an oxygenated medical fluid, or whether a perfusion with a solution containing a specific chemical or biomarker should be performed at normothermic and/or hypothermic temperatures (or performed in vivo (for heart beating donors) or in vitro). Use of the compiled data record in the methods of the present disclosure may prevent damage to the donor organ and increase the number and quality of donor organs available for transplantation by ensuring the highest number of organs remain suitable for transplantation.

The methods discussed herein may be employed to protect or prevent a donor tissue and/or organ of a mammal from damage, such as damage due to tissue anoxia, ischemia, or reperfusion injury. Additionally, methods discussed herein may be employed to restore a tissue or an organ of a mammal that has suffered damage, such as damage due to tissue anoxia, ischemia, or reperfusion injury.

In embodiments, normothermic treatment to restore an organ's viability may be employed, optionally after an organ has been subjected to hypothermic temperatures, statically and/or under perfusion. Such initial hypothermic exposure might occur, for example, during transport and/or storage of an organ after harvesting. The treatment is also suitable for organs that will ultimately be stored and/or transported under hypothermic conditions. In other words, the treatment can be applied to organs prior to cold storage and/or transport.

In the normothermic perfusion mode, gross organ perfusion pressure may be provided by a pneumatically pressurized medical fluid reservoir controlled in response to a sensor disposed in an end of tubing placed in the organ, which may be used in combination with a stepping motor/cam valve or pinch valve which provides for perfusion pressure fine tuning, prevents overpressurization and/or provides emergency flow cut-off. Alternatively, the organ may be perfused directly from a pump, such as a roller pump or a peristaltic pump, with proper pump control and/or sufficiently fail-safe controllers to prevent overpressurization of the organ, which may occur as a result of a system malfunction. Substantially eliminating overpressurization prevents and/or reduces damage to the vascular endothelial lining and to the organ tissue in general.

In embodiments, a viability index of the organ may be monitored, for example, automatically, by monitoring one or more "biomarkers." The term "biomarkers" refers, for example, to any small molecule, large molecule and/or biological substance that are produced by the organ and/or tissue and/or introduced into the organ and/or tissue or otherwise exist in the organ that provide insight to the state of the organ, such as the state of being suitable for transplantation and/or unsuitable for transplantation. In embodiments, "monitoring one or more biomarkers" may include, for example, monitoring the stability of a component, such as a hormone and/or other chemicals or there levels (concentrations), produced by the donor organ; monitoring the stability of a component, such as a small molecule, large molecule and/or biological substance that is introduced into the donor organ or otherwise exists in the organ; monitoring the metabolism of the organ and/or stability of the metabolism rate; monitoring the oxygen consumption rate and/or stability of the oxygen consumption rate; monitoring the glucose concentration and/or stability of the glucose concentration; monitoring the consumption/consumption rate of glucose; monitoring the creation of lactic acid; monitoring the lactate concentration; monitoring the pH and/or stability of the pH; monitoring the $pO_2$ and/or stability of the $pO_2$; monitoring the $pCO_2$ and/or stability of the $pCO_2$; monitoring the $pH_2$ and/or stability of the $pH_2$; monitoring the calcium levels and/or stability of the calcium levels; monitoring the organ resistance (pressure/flow); monitoring the T/GST levels; monitoring the Tprotein levels; monitoring the base excess; monitoring the rate and extent of a predetermined molecule, substance or component's absorption; monitoring the extraction or leaching of one or more molecules, components or substances that the organ or tissue is exposed to; monitoring the extraction or leaching of one or more molecules, components or substances naturally present in the organ; identifying and/or monitoring the presence of metabolites of a natural or added substance; monitoring the organ control of the concentration of a molecule, substance and/or metabolites; monitoring the tissue binding and accumulation of one or more molecules, components or substances or rate thereof; monitoring the tissue clearance and elimination of one or more molecules, components or substances or rate thereof; monitoring the composition of a functional effluent (which may be dependent on the organ or tissue), such as kidney urine, liver bile or lung mucus or an effluent comprising pancreatic exocrine digestive enzymes; monitoring the secretory products such as hormones released into perfusion effluent; among others, and/or monitoring the combination of one or more of the above in a fluid and/or tissue, such as a fluid that has been perfused through the organ and/or collected, or a tissue piece that has been collected from the donor organ and/or tissue.

In embodiments, the one or more qualitative and/or quantitative relationship may be a ratio of the levels of one or more of the above biomarkers with respect to a control or one or more other biomarkers. In embodiments, the one or more qualitative and/or quantitative relationship may be a ratio of the levels of one or more of the above biomarkers with respect to a control or one or more other biomarkers that are included in the perfusate by way of a standard addition method. In embodiments, the one or more qualitative and/or quantitative relationship may be a ratio of the levels of one or more of the above biomarkers with respect to a control or one or more other biomarkers and include a relationship of that ration with respect to information regarding one or more perfusion parameters or conditions (such as temperature or perfusion pressure).

In embodiments, the methods of the present disclosure comprise a quantifying, determining and/or calculating a relationship between one or more of the above biomarkers with one or more other biomarkers and an/or information regarding one or more perfusion parameters or conditions (such as temperature or perfusion pressure). The term "determining" may refer to, for example, a quantitative or qualitative analysis of a perfusate sample that has been exposed to the organ and/or a quantitative or qualitative analysis of a sample of the organ itself. "Determining" may also means detecting or quantifying interaction between biomarkers, such as the detection of binding between two species. "Monitoring" as used herein with respect to biomarkers may refer to either performing a quantitative detection of the one or more biomarkers, or to perform a qualitative detection of the biomarker. For example, in embodiments, monitoring may include simply measuring or simply monitoring the intensity of fluorescence from a biomarker, or measuring a change or the amount of a change in an optical character of a biomarker by using a plural wavelength and optionally calculating a ratio between the measured values for one or more biomarkers, which optionally may be followed by a determination of the concentration of the biomarkers with the ratio.

The various known detectors, sensors and monitoring devices may be used to monitor the above-mentioned biomarkers. Additionally, detectors, sensors and monitoring devices may include a pressure sensor, a pH detector, an oxygen sensor and a flow meter.

Data acquired with respect to the above biomarkers may be correlated with data relating to the transplant outcomes in order to build a data record or database of information that may serve as a basis for to develop/tailor/customize methods to (1) optimize preservation and/or (2) sustain, maintain or improve the viability of the organs before and/or during transplantation. For example, the information in the data record data may be coupled with data relating to the conditions experienced by the system, in particular conditions experienced by the organ and the perfusate that are detected and monitored (such as data collected from a pressure sensor, a temperature sensor, a pH detector, an oxygen sensor and/or a flow meter. The detected data may then be compared with compiled data that has been correlated with transplant outcomes.

In embodiments, information relating to one or more qualitative and/or quantitative relationship of one or more predetermined biomarkers while organs were transported and/or stored in at least one device selected from an organ transporter, perfusion apparatus, cassette, and organ diagnostic apparatus is collect and used to populate a database. Such qualitative and/or quantitative relationship may include, for example, quantitative and/or qualitative information relating the concentration and/or abundance of liver enzyme release, bile and albumin secretion (with respect to the oxygen concentration), after perfusion of livers with oxygen, which then may be correlated with transplant outcomes. Such qualitative and/or quantitative relationship may also include, for example, information relating the concentration and/or abundance of liver enzyme release, bile and albumin secretion compared with livers perfused without exogenous oxygen, which may be correlated with transplant outcomes.

In embodiments, the methods of the present disclosure include compiling a database of monitored information regarding potential biomarkers. Various molecules that are present in the tissue and/or secreted may be screened for their ability to be used as potential biomarkers for a respective organ and/or condition of the organ. Such screening procedures may involve using gene expression and protein secretion profiling, before transplantation and correlate them with ex vivo and in vivo outcomes. For example, with respect to the liver, during perfusion and subsequent testing samples will be collected at frequent intervals and a battery of assays may be performed on the samples including prioritized end point assays to measure metabolic acidosis and hypoglycemia, bile production, Kupffer cell activation and sinusoidal endothelial cell dysfunction. The biomarkers of the present disclosure may also be selected, at least based in-part, on in vivo studies that may include assessment of liver recipient encephalopathy and coagulopathy.

In embodiments, the methods of the present disclosure may include performing a database inquiry to select or determine suitable biomarkers for a specific organ either before or after organ procurement. In embodiments, the suitable biomarker may be one of the potential biomarkers for a respective organ and/or condition of the organ identified by the screening process discussed above. In embodiments, an initial assessment of a select set of predetermined biomarkers is compared to normative ranges that are established for a respective procured organ based on the compiled info nation contained in the database and/or data record. In embodiments, the set of predetermined biomarkers to be monitored is selected based on the identity of the organ being stored/preserved/transplanted. In embodiments, the initial set of predetermined biomarkers assessed is selected based on the identity of the organ being stored/preserved/transplanted.

In embodiments, the initial set of predetermined biomarkers assessed is selected is selected based at least in-part on whether the organ originated from a heart beating donor or a non-heart beating donor. In embodiments, the set of predetermined biomarkers to be monitored is selected based at least in-part on whether the organ originated from a heart beating donor or a non-heart beating donor. In embodiments, the initial set of predetermined biomarkers assessed is selected is selected based at least in-part on whether the organ is diseased or injured before procurement of the organ. In embodiments, the set of predetermined biomarkers to be monitored is selected based at least in-part on whether the organ is diseased or injured before procurement of the organ.

In embodiments, the methods of the present disclosure may include performing a database inquiry of the compiled data record and/or database to select or determine suitable perfusion (such as the perfusate composition) and/or transport conditions in order to enhance or attenuate the level of at least one or more biomarkers such that the observed biomarker level is brought within a predetermined normative range for said biomarker. In embodiments, the methods of the present disclosure may include performing a database inquiry in order to determine predetermined normative range for a specific biomarker. For example, such an inquiry may be limited to organs acquired under similar circumstances (e.g., time of ischemic injury, heart beating donor versus non-heart beating donor, preexisting injury or disease of the donor, blood type and/or various physiological conditions, among others) to the organ being stored/preserved/transplanted.

In embodiments, predetermined normative ranges for a set (two or more) of specific biomarkers (along with normative ranges for the quantitative and/or qualitative relationships between two or more members of the set of specific biomarkers) are selected based at least in-part on information contained in the data base. In embodiments, levels (and quantitative and/or qualitative relationships between one or more members of the set of specific biomarkers) of a set of predetermined biomarkers being monitored is compared to normative ranges of such biomarkers (and normative ranges established for the quantitative and/or qualitative relationships of said set of specific biomarkers) that are established for a respective procured organ based on the compiled information contained in the database and/or data record.

In embodiments, organ therapy decisions and/or the specific strategy (such as the perfusate composition, which may be a combination of a number of perfusate solutions) for preservation and/or sustaining, maintaining or improving the viability of the organs is selected based (at least in-part) on the quantitative and/or qualitative relationship (which may be based on one or more factors, such as concentration of a specific biomarker, or the mere detectable level of a particular biomarker versus the non-detectable level of a different biomarker) of one or more of the predetermined biomarkers that are being monitored (for a respective organ).

For example, organ therapy decisions and/or the specific strategy for preservation and/or sustaining, maintaining or improving the viability of the organs is selected based (at least in-part) on the quantitative and/or qualitative relationship may include decisions with respect to how to effectively employ a liver perfusion device, such as one with oxygenation capabilities. Specifically, determinations may be based at least in-part on information obtained from the database may be used to determine whether or not independent hepatic artery and portal vein perfusion are required for machine perfusion, such as hypothermic machine perfusion, or whether perfusion of both arterial and venous circulatory systems of the liver may be needed.

The methods of the present disclosure may also include steps for monitoring the predetermined biomarkers for liver function and may use information from the data in order to make organ therapy decisions and/or the specific strategy (such as the perfusate composition, which may be a combination of a number of perfusate solutions) for preservation and/or sustaining, maintaining or improving the viability of the organs based at least in-part on the quantitative and/or qualitative relationships of the predetermined biomarkers. For example, the detection of the presence of biomarkers indicative of oxidative damage induced by oxygenation (or a predetermined level of these biomarkers, the level of which may depend on the identity of the respective organ) may require perfusion of the organ with a perfusate containing an effective amount of antioxidants in order to reduce and/or eliminate the risk of oxidative damage.

In embodiments, a control system including a microprocessor may be used to generate a real-time organ viability index that is based on information gleaned from the data record and its comparison with data recorded by the detectors, sensors and monitoring devices of the donor organ to be transplanted.

The control system may also include a thermal controller for controlling temperature of at least one of the perfusate and the organ. The thermal controller can control the temperature of one or more medical fluid reservoirs and the organ container by controlling the TEDs. The temperature sensors may be connected to the controller to facilitate monitoring and control.

In embodiments, the effluent may be assayed after it is recovered leaving the organ or tissue via a vein, such as insulin and glucagons from the pancreas, albumin and glucose from the liver, oxygen and carbon dioxide from the lung or creatinine from the kidney. In the heart and intestine, detection of a motor response, such as heartbeat and peristalsis, may also be monitored.

An organ viability index may be provided taking into account the various measured biomarkers identified above. The index may be organ specific, or may be adaptable to various organs. The index compiles the monitored parameters into a diagnostic summary to be used for making organ therapy decisions and deciding whether to transplant the organ. The index may be automatically generated and provided to the physician.

In embodiments, depending on the particular organ therapy decision and the decision regarding whether to transplant the organ, normothermic perfusion may be preceded by and/or followed by hypothermic perfusion, near-normothermic perfusion, or mid-normothermic perfusion or combinations thereof. Such perfusion conditions may also be employed in vivo as well as in vitro prior to removal of the organ from the donor.

For example, in embodiments, where the organ therapy regimen did not result in an organ that has a predetermined level of viability and thus the organ has been determined to be unsuitable for transplantation, hypothermic perfusion may be employed to reduce the organ's metabolic rate, allowing the organ to be preserved for extended periods of time such that the organ may be used for further medical research and testing.

In embodiments, a medical fluid may be fed into the organ by pressure from an intermediary tank that has a low pressure head so overpressurization of the organ is avoided. Alternatively, in embodiments, gravity can be used to feed the medical fluid into the organ from the intermediary tank, if appropriate. Alternatively, the organ may be perfused directly from a pump, such as a roller pump or a peristaltic pump, with proper pump control and/or sufficiently fail-safe controllers to prevent overpressurization of the organ, especially as a result of a system malfunction. Substantially eliminating overpressurization prevents or reduces damage to the vascular endothelial lining of the organ and to the organ tissue in general, in particular at hypothermic temperatures when the organ has less ability to protect itself by vascular constriction. Viability of the organ may also be monitored with respect to one or more biomarkers during any phase of the recovery process, preservation process, and/or transplantation process, such as by monitoring organ resistance (pressure/flow) and/or levels of predetermined chemicals in the medical fluid that has been perfused through the organ and/or collected.

The methods of the present disclosure may include a control system for automatically controlling perfusion of one or more organs by selecting between perfusion modes and control parameters. Automatic perfusion may be based on sensed conditions in the system or manually input parameters. The system may be preprogrammed or programmed during use on the basis of information obtained from the compiled data record.

The methods of the present disclosure may utilize a perfusion apparatus, which may be used for various organs, such as the kidneys, and may be adapted to more complex organs, such as the liver, having multiple vasculature structures, for example, the hepatic and portal vasculatures of the liver. It should be appreciated that the organ and/or tissues for use with the methods of the present disclosure may be any type of organ and/or tissue, such as a kidney, heart, liver, lungs or pancreas, for example, and the organ may be from any species, such as a human or other animal.

Figure 2:
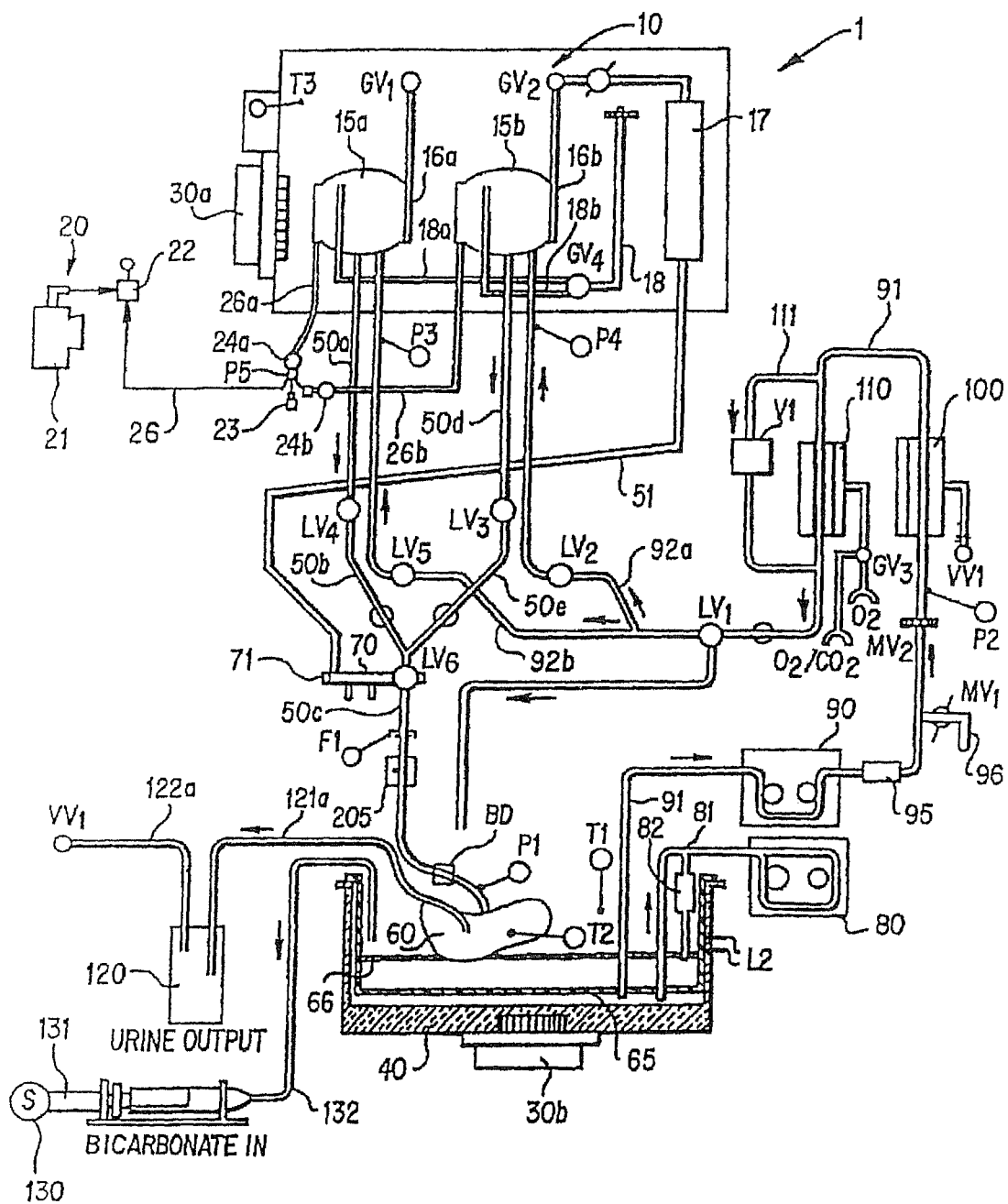
FIG. 2 is a schematic diagram of the apparatus of FIG. 1.
Figure 3:
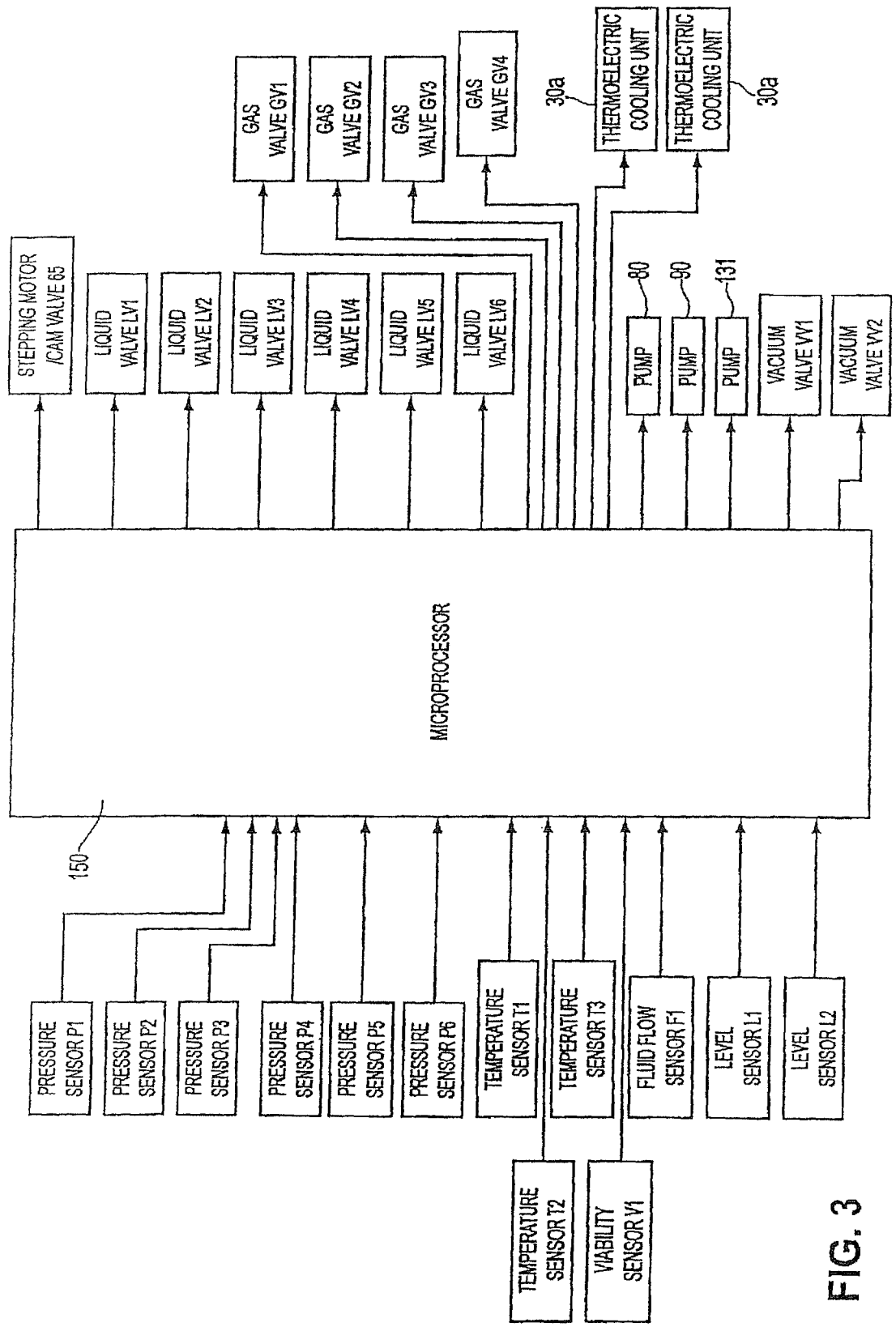
FIG. 3 is a diagram of the electronics of the apparatus of FIG. 1.

FIG. 1 shows an exemplary organ perfusion apparatus 1. FIG. 2 is a schematic illustration of the apparatus of FIG. 1. The apparatus 1 may be at least partially microprocessor controlled, and pneumatically actuated. The microprocessor 150 connection to the sensors, valves, thermoelectric units and pumps of the apparatus 1 is schematically shown in FIG. 3. Microprocessor 150 and apparatus 1 may be configured to and are preferably capable of further being connected to a computer network to provide data sharing, for example across a local area network or across the Internet.

The organ perfusion apparatus 1 is capable of perfusing one or more organs simultaneously, at normothermic, near-normothermic, mid-normothermic and hypothermic temperatures (hereinafter, normothermic, near-normothermic, mid-normothermic and hypothermic perfusion modes). All medical fluid contact surfaces may be foamed of or coated with materials compatible with the medical fluid used, such as non-thrombogenic materials. As shown in FIG. 1, the apparatus 1 includes a housing 2 that includes front cover 4, which may be translucent, and a reservoir access door 3. The apparatus may have one or more control and display areas 5a, 5b, 5c, 5d for monitoring and controlling perfusion.

As schematically shown in FIG. 2, enclosed within the housing 2 is a reservoir 10 that may include three reservoir tanks 15a, 15b, 17. Two of the reservoir tanks 15a, 15b are may be standard one liter infusion bags, each with a respective pressure cuff 16a, 16b. A pressure source 20 can be provided for pressurizing the pressure cuffs 16a, 16b. The pressure source 20 is preferably pneumatic and may be an on board compressor unit 21 supplying at least 10 LPM external cuff activation via gas tubes 26, 26a, 26b, as shown in FIG. 2. The present disclosure, however, is not limited to use of an on board compressor unit as any adequate pressure source can be employed, for example, a compressed gas (e.g., air, $CO_2$, oxygen, nitrogen, etc.) tank (not shown), such as with a tank volume of 1.5 liters at 100 psi or greater for internal pressurization. Alternatively, an internally pressurized reservoir tank (not shown) may be used. Reservoir tanks 15a, 15b, 17 may, in embodiments, be bottles or other suitably rigid reservoirs that can supply perfusate by gravity or can be pressurized by compressed gas.

Gas valves 22-23 are provided on the gas tube 26 to allow for control of the pressure provided by the onboard compressor unit 21. Anti-back flow valves 24a, 24b may be provided respectively on the gas tubes 26a, 26b. Pressure sensors P5, P6 may be provided respectively on the gas tubes 26a, 26b to relay conditions therein to the microprocessor 150, shown in FIG. 3. Perfusion, diagnostic and/or transporter apparatus may be provided with sensors to monitor perfusion fluid pressure and flow in the particular apparatus to detect faults in the particular apparatus, such as pressure elevated above a suitable level for maintenance of the organ. Gas valves $GV_1$ and $GV_2$ may be provided to release pressure from the cuffs 16a, 16b. One or both of gas valves $GV_1$ and $GV_2$ may be vented to the atmosphere. Gas valve $GV_4$ in communication with reservoir tanks 15a, 15b via tubing 18a, 18b may be provided to vent air from the reservoir tanks 15a, 15b through tubing 18. Tubing 18, 18a, 18b, 26, 26a and/or 26b may be configured with filters and/or check valves to prevent biological materials from entering the tubing or from proceeding further along the fluid path. The check valves and/or filters may be used to prevent biological materials from leaving one organ perfusion tubeset and being transferred to the tubeset of a subsequent organ in a multiple organ perfusion configuration. The check valves and/or filters may also be used to prevent biological materials, such as bacteria and viruses, from being transferred from organ to organ in subsequent uses of the perfusion apparatus in the event that such biological materials remain in the perfusion apparatus after use. The check valves and/or filters prevent contamination problems associated with reflux in the gas and/or vent lines. For example, the valves may be configured as anti-reflux valves to prevent reflux. The third reservoir tank 17 is preferably pressurized by pressure released from one of the pressure cuffs via gas valve $GV_2$.

An organ diagnostic apparatus may also be employed in the methods of the present disclosure, if necessary, in the production of diagnostic data, such as an organ viability index. The organ diagnostic apparatus may include features of an organ perfusion apparatus, such as sensors and temperature controllers, as well as cassette interface features, and provides analysis of input and output fluids in a perfusion system. In embodiments, the organ diagnostic apparatus may be a simplified perfusion apparatus providing diagnostic data in a single pass, in-line perfusion.

The methods of the present disclosure may also include the use of an organ cassette that allows an organ to be easily and safely moved between apparatus for perfusing, storing, analyzing and/or transporting the organ. The organ cassette may be configured to provide uninterrupted sterile conditions and efficient heat transfer during transport, recovery, analysis and storage, including transition between the transporter, the perfusion apparatus and the organ diagnostic apparatus.

The methods of the present disclosure may also include the use of an organ transporter that allows for transportation of an organ over long distances. The organ transporter may be used for various organs or tissues, including glandular organs or tissues such as liver, lung, kidney, intestine, heart, pancreas, spleen, testes, placenta, thymus, arteries, veins, lymph nodes, bone or skeletal muscle, male or female reproduction organs, or endocrine/exocrine glands, including, for example, adrenal glands. The organ transporter may include features of an organ perfusion apparatus, such as sensors and temperature controllers, as well as cassette interface features.

In the methods of the present disclosure, perfusion apparatus, transporter, cassette, and organ diagnostic apparatus may be networked to permit remote management, tracking and monitoring of the location, biomarkers, therapeutic and diagnostic parameters of the organ or organs being stored or transported. The information systems may be used to compile historical data of organ transport and storage, and provide cross-referencing with hospital and United Network for Organ Sharing (UNOS) data on the donor and recipient. The data collected may be compiled in a database and correlated with outcome data to allow for examination, selection of biomarkers, and assessment of nominal ranges for biomarkers and perfusion condition parameters.

The solution or medical fluid for use with the methods of the present disclosure may be a natural fluid, such as blood, or otherwise synthetic fluid, which may, for example, be a simple crystalloid solution, or may be augmented with an appropriate oxygen carrier. In embodiments, the solution or medical fluid that may comprise at least one small molecule, large molecule, biochemical component, pharmacological component, and/or biological substances (such as one or more of these entities that have an influence on one or more predetermined biomarkers) may be prepared by mixing a first portion of the solution, which may be a medical fluid and/or base perfusion solution, with at least one molecule, component or substance to produce a first mixed solution. In embodiments, the first mixed solution is perfused through an organ or tissue in order to influence on one or more predetermined biomarkers, (such as by increasing, decreasing or maintaining the concentration of the respective predetermined biomarker(s)). In embodiments, a second mixed solution, third mixed solution, fourth mixed solution, fifth mixed solution, etc., which may be prepared in a similar manner as the first mixed solution, may also be perfused through an organ or tissue (either separately, or in combination with the first solution). In embodiments, one or more of the second mixed solution, third mixed solution, fourth mixed solution, fifth mixed solutions may be identical to the first mixed solution (before introduction to the organ or tissue), but maintained at a different temperature.

In embodiments, one or more of the second mixed solution, third mixed solution, fourth mixed solution, fifth mixed solutions may be different from the first mixed solution and either comprise different concentrations of the respective one molecules, components and/or substances comprised in the first mixed solution and/or comprise more or fewer components than the first mixed solution. In embodiments, one or more solutions and/or medical fluids that do not comprise said molecule, component or substance may also be perfused through an organ or tissue either before or after any of the above described mixed solutions; alternatively, the organ or tissue may be statically exposed to one or more solutions of the present disclosure by simply immersing the organ or tissue in the solution either before, after or during perfusion with an identical or different solution.

In embodiments, increasing the $O_2$ content any of the solutions, replenishing the $O_2$ content any of the solutions, and/or introducing an $O_2$ content into any of the solutions described in the present disclosure may occur by methods known of to those of ordinary skill in the art, such as by use of a known oxygenator. For example, $O_2$ used to perfuse the organ may be dissolved in a liquid and then administered to the organ as a gas/liquid solution. In embodiments, selection and/or optimization of oxygenation may employ an oxygenator that does not require tanked gases. For example, the methods of the present disclosure may employ i a compressed gas-free oxygenation system into a perfusion and/or transport device.

Alternatively, $O_2$ (or any other desired gas $N_2$, $H_2$, $CO_2$, CO, water vapor) may be dissolved in ambient air or one or more other gases and then administered to the organ as a gas/gas mixture (perfusion with a gas or with a gas/gas mixture alternatively being referred to herein as "persufflation"). Exemplary persufflation devices and methods are described in U.S. Patent Application Publication No. 2010/0330547, which is incorporated herein by reference in its entirety.

In embodiments, an oxygen supply may be coupled to an oxygenator through a pressure regulator. The oxygenator may be attached to the side of a reservoir or a container comprising the organ. Similarly, the bubble remover may be attached to a container comprising the organ. The bubble remover may also be independent of a container comprising the organ or integrated into a container comprising the organ or another part of the apparatus.

In embodiments, the oxygen carrier may, for example, be washed, stabilized red blood cells, cross-linked hemoglobin, pegolated hemoglobin or fluorocarbon based emulsions. In embodiments, the solution or medical fluid that may comprise the at least one molecule, component or substance may also contain antioxidants known to reduce peroxidation or free radical damage in the physiological environment and specific agents known to aid in organ protection. In embodiments, an oxygenated, e.g., cross-linked hemoglobin-based bicarbonate, solution that may comprise the at least one molecule, component or substance may be used for a normothermic mode while a non-oxygenated, e.g., simple crystalloid solution, such as one augmented with antioxidants, solution that may comprise the at least one molecule, component or substance may be used for a hypothermic mode. In embodiments, the solutions or medical fluids (that may comprise the at least one small or large molecule, component or substance intended to condition the organ and/or tissue) used in any of the temperature modes may be designed or selected to reduce or otherwise prevent damage or injury in the organ or tissue, such as the washing away of, or damage to, the vascular endothelial lining of the organ.

For a hypothermic perfusion mode, as well as for flush and/or static storage, an exemplary solution to which at least one molecule, component or substance may be added is disclosed in U.S. Pat. No. 6,492,103, the disclosure of which is hereby incorporated herein by reference in its entirety. Examples of additives which may be used in perfusion solutions, which may comprise at least one small or large molecule, component or substance intended to condition the organ and/or tissue, are also disclosed in U.S. Pat. No. 6,046,046 to Hassanein, the disclosure of which is hereby incorporated by reference herein in its entirety. Other suitable solutions and materials may also be used.

In embodiments, the methods of the present disclosure may be accomplished by incorporating one or more small or large molecule, component or substance intended to condition the organ and/or tissue into known systems and solutions, such as KPS-1™ and SPS-1™ available from Organ Recovery Systems, and/or those taught in the Brasile and Taylor patents (U.S. Pat. Nos. 5,643,712; 5,699,793; 5,843,024 to Brasile and U.S. Pat. Nos. 5,599,659; 5,702,881 to Brasile et al.; U.S. Pat. Nos. 5,405,742 and 5,514,536 to Taylor, each of which is incorporated herein by reference in its entirety), which have required completely different compositions for different stages of organ procurement, preservation and transplantation procedures.

Alternatively, the methods of the present disclosure may be accomplished by incorporating one or more small or large molecule, component or substance intended to condition the organ and/or tissue into one or two (or optionally more) base compositions (such as the base compositions disclosed in U.S. Pat. Nos. 6,994,954 and 6,492,103 to Taylor each of which is incorporated herein by reference in its entirety) and a number of different additives that can be added to one or more of the base compositions to produce specific compositions useful for specific stages in organ or tissue procurement, preservation and transplantation. In embodiments, the base solution and additives, including, for example, small or large molecule, component or substance intended to condition the organ and/or tissue, may be stored in separate containers in a single package or kit. In embodiments, the at least one molecule, component or substance may be present in the above solutions and/or compositions in a sufficient amount to assure complete complement coverage and substantially eliminate cellular damage.

A base formulation, which may comprise at least one small or large molecule, component or substance intended to condition the organ and/or tissue, may include a design that takes into account the biophysical and minimal biochemical components that can be standardized for all or a desired subset of applications. Such a base solution may then be used as a vehicle for a range of additive "cocktails," including one or more small or large molecules, components or substances intended to condition the organ and/or tissue, to derive a system of solutions, each of which may be used at various stages during organ preservation, transport and transplantation, optimized for different needs. In embodiments, the at least one molecule, component or substance may be present in the base solutions in a sufficient amount to assure complete complement coverage and substantially eliminate cellular damage.

In embodiments, solutions for warm ischemic time-organ preservation may include adding at least one molecule, component or substance (which may or may not be the same molecule, component or substance) to, for example, one or more of the following solutions: a hypothermic flush/purging solution, a hypothermic perfusate/maintenance solution, a normothermic perfusate/rescue solution and/or a pre-reimplantation flush/rinse solution. In embodiments, one or more of the above solutions, which may include at least one molecule, component or substance (which may or may not be the same molecule, component or substance) may be perfused through the donor organ before and/or during transplantation procedures.

Exemplary embodiments may include, for example, adding the at least one molecule, component or substance (such as a predetermined biomarker or a molecule known to influence a predetermined biomarker) to the following base solutions:

Intracellular Base Solution: minimum requirements for cold storage including cryopreservation solutions. An exemplary formulation of such a solution is given in Table 2 (below).

Extracellular Base Solution: plasma-like electrolytes as base for oxygen carrying molecules and other substrates necessary for optimized "normothermic" perfusion.

Exemplary embodiments may include, for example, adding at least one molecule, component or substance to the following base plus additive solutions:

Purge=Extracellular Base plus purge additive ("cocktail") designed principally to purge the vasculature of blood in preparation for preservation.

Maintenance=Intracellular Base plus cytoprotection additive ("cocktail") designed to protect and maintain cellular stability during cold storage. Ideally, this will apply to both static cold storage and cold machine perfusion.

Rescue=Extracellular Base plus rescue additive ("cocktail") for near normothermic perfusion.

Rinse=Extracellular Base plus rinse additive ("cocktail") designed to flush out unwanted preservation molecules prior to reimplantation. This may fulfill a different role from the Purge solution designed to remove erythrocytes and other blood components prior to the preservation phase.

Cryo=Concentrated Intracellular Base plus permeating or non-permeating cryoprotective additives for sub-zero preservation of cells and tissues. For the Cryo embodiment, the intracellular base is preferably concentrated to a 3× to 4× strength in comparison to its use alone and with most other additives. This facilitates its combination with additive cryoprotective compounds.

In embodiments, at least one molecule may be present in the solution and/or composition being perfused in an effective and/or sufficient amount to assure complete coverage of the organ or tissue with said molecule and/or return the level of a predetermined biomarker to within the nominal range for an organ suitable for transplantation. In embodiments, the at least one component or substance may be present in the solution and/or composition being perfused in an effective and/or sufficient amount to (1) assure complete complement (e.g., an entity produced by the organ or tissue in response to said component or substance) coverage of the organ or tissue, and (2) substantially prevent and/or completely prevent cellular damage. In embodiments, the at least one molecule, component or substance is administered by perfusion techniques in an effective and/or sufficient amount to assure complete coverage of the organ or tissue with said component or substance and/or return the concentration of a predetermined biomarker to within the nominal range for an organ suitable for transplantation. In embodiments, the at least one component is administered by perfusion techniques in an effective and/or sufficient amount to (1) assure complete coverage of the organ or tissue with said component, and (2) substantially prevent and/or completely prevent cellular damage.

In embodiments, the methods of the present disclosure comprise perfusing an organ or tissue (which may also be referred to hereinafter as a "donor organ") with one or more of the solutions described in the present disclosure (which may comprise at least one molecule, biomarker, component or substance) for predetermined intervals. As used herein "solution" encompasses, for example, any solution, such as a base perfusion solution, unless otherwise specifically limited. In embodiments, multiple solutions that are not identical are perfused into the donor organ, where at least one of the solutions that are perfused into the donor organ contains at least one molecule, component or substance that influences at least one biomarker, such as, for example, by increasing or decreasing the concentration (or level) of the biomarker. In embodiments, multiple solutions that are not identical are perfused into the donor organ before and/or during transplantation procedures. In embodiments, each of the solutions that are perfused into the organ may contain the same molecule, component or substance.

In embodiments, multiple solutions that are not identical are perfused into the donor organ and each of the different solutions that are perfused into the organ contains a small or large molecule, component or substance (which is intended to influence a specific biomarker, such as, for example, by increasing or decreasing the concentration of the biomarker) not identical to the small or large molecule, component or substance contained in the other solutions (which may influence a different biomarker, such as, for example, by increasing or decreasing the concentration of the biomarker). In embodiments, at least one of the solutions that are perfused into the organ contain a second small or large molecule, component or substance and/or a third, fourth, fifth, etc., that is different from each other and/or the combination of small or large molecules, components or substances in any of the other solutions.

In embodiments, the at least one molecule, component or substance, which may or may not have an influence on the concentration or appearance/emergence of a predetermined biomarker, is comprised in a solution that is introduced and/or perfused through the donor organ before any cooling of the donor organ occurs. In embodiments, the at least one molecule, component or substance is comprised in a solution that is introduced and/or perfused through the donor organ before cooling the donor organ to a predetermined temperature, such as before the organ is cooled to a temperature less than about 15° C., or before the organ is cooled to a temperature less than about 10° C., or before the organ is cooled to a temperature less than about 5° C., or before the organ is cooled to a temperature less than about 0° C.

In embodiments, the at least one molecule, component or substance, which may or may not have an influence on the concentration or appearance/emergence of a predetermined biomarker, may be comprised in a solution that is only introduced and/or perfused through the donor organ while the organ is maintained mid and/or normothermic predetermined temperature range, such as from about 10° C. to about 37° C., or from about 15° C. to about 37° C., or from about 20° C. to about 37° C., or from about 20° C. to about 30° C., or from about 20° C. to about 25° C.

In embodiments, the at least one molecule, component or substance, which may or may not have an influence on the concentration or appearance/emergence of a predetermined biomarker, may be comprised in a solution that is only introduced and/or perfused through the donor organ while the organ is maintained at a low and/or mid predetermined temperature range, such as from about 0° C. to about 20° C., or from about 10° C. to about 20° C., or from about 10° C. to about 15° C., or from about 0° C. to about 15° C., or from about 0° C. to about 10° C., or from about 0° C. to about 5° C., or at a temperature less than about 0° C.

In embodiments, the at least one molecule, component or substance, which may or may not have an influence on the concentration or appearance/emergence of a predetermined biomarker, may be comprised in a solution that is introduced and/or perfused through the donor organ after cooling the donor organ, such as after the organ has been cooled to a temperature less than about 15° C., or after the organ has been cooled to a temperature less than about 10° C., or after the organ has been cooled to a temperature less than about 5° C., or after the organ has been cooled to a temperature less than about 0° C.

In embodiments, the donor organ is not exposed to the small or large molecule, component or substance, which may or may not have an influence on the concentration or appearance/emergence of a predetermined biomarker, until the organ has been cooled to a predetermined temperature, such as a temperature less than about 20° C., or a temperature less than about 10° C., or a temperature from about 0° C. to about 10° C., or a temperature less than about 0° C. In such embodiments, the at least one molecule, component or substance is comprised in a solution that is initially introduced and/or perfused through the donor organ after cooling the donor organ by perfusing the donor organ with one or more preservation solutions that do not contain any small or large molecules, components or substances that are intended to condition the organ and/or tissue (as described above). For example, the at least one molecule, component or substance may be included in a solution that is initially introduced and/or perfused through the donor organ after cooling the donor organ (such as by perfusing the donor organ with a different preservation solution that does not contain a small or large molecule, component or substance intended to condition the organ and/or tissue) to a temperature of less than about 15° C., or after the organ has been cooled to a temperature less than about 10° C., or after the organ has been cooled to a temperature less than about 5° C., or after the organ has been cooled to a temperature less than about 0° C. In alternative embodiments, before the donor organ is cooled, the organ is perfused with a solution that may contain at least one small or large molecule, component or substance intended to condition the organ and/or tissue.

In embodiments, the at least one molecule, component or substance, which may or may not have an influence on the concentration or appearance/emergence of a predetermined biomarker, may be comprised in a solution that is introduced and/or perfused through the donor organ during a re-warming process, such as, for example, a re-warming process that occurs after the organ has been cooled, such as after the organ has been cooled to a predetermined temperature.

In embodiments, the at least one molecule, component or substance, which may or may not have an influence on the concentration or appearance/emergence of a predetermined biomarker, may be comprised in a solution that is initially introduced and/or perfused through the donor organ during a re-warming process that occurs after the organ has been cooled to a predetermined temperature. In specific embodiments, the donor organ is not exposed to the small or large molecule, component or substance intended to condition the organ and/or tissue until the donor organ experiences a re-warming process that occurs after the organ has been cooled to a predetermined temperature, such as a temperature less than about 20° C., or a temperature less than about 10° C., or a temperature from about 0° C. to about 10° C., or a temperature less than about 0° C. In embodiments, the donor organ may not be exposed to a small or large molecule, component or substance intended to condition the organ and/or tissue until a re-warming process occurs and the organ is perfused with a solution comprising at least one molecule, component or substance during the re-warming process while the donor organ is being maintained a temperature from about 0° C. to about 37° C., such as a temperature from about 10° C. to about 37° C., or a temperature from about 20° C. to about 37° C.

In embodiments, the solution contains an effective amount of the at least one molecule, component or substance to protect against tissue damage. In embodiments, the solution contains an effective amount of the at least one molecule, component or substance to prevent or substantially prevent delayed graft function, deleterious effects of ischemia/reperfusion injury, including inflammatory reactions, and/or other detrimental responses that can injure the organ or recipient. In embodiments, the solution contains an effective amount of the at least one molecule, component or substance to prevent or substantially prevent delayed graft function, deleterious effects of ischemia/reperfusion injury, including inflammatory reactions, and/or other detrimental responses that can injure the organ or recipient, which including precipitating or enhancing an immunological reaction from the recipient with the potential of compromising the graft's and/or recipient's short term and/or long term health and proper functionality.

In embodiments, the at least one molecule, component or substance, which may or may not have an influence on the concentration or appearance/emergence of a predetermined biomarker, represents from about 0.000001% to about 0.5% of the total weight of the solution (the term solution, as has used herein and throughout the present disclosure, may refer to a base perfusion solution), such as from about 0.00001% to about 0.1% of the total weight of the base perfusion solution, or from about 0.0005% to about 0.05% of the total weight of the base perfusion solution. In embodiments, the at least one molecule, component or substance, which may or may not have an influence on the concentration or appearance/emergence of a predetermined biomarker, may be present in the solution (which, as discussed above, may be a base perfusion solution) in an amount greater than about 0.01 µg/ml, such as in an amount greater than about 0.1 µg/ml, or in an amount greater than about 1 µg/ml, or in an amount greater than about 10 µg/ml, or in an amount greater than in an amount greater than about 200 µg/ml. In embodiments, the at least one molecule, component or substance, which may or may not have an influence on the concentration or appearance/emergence of a predetermined biomarker, may be present in the solution (which, as discussed above, may be a base perfusion solution) in an amount of from about 0.01 µg/ml to about 500 µg/ml, such as in an amount of from about 0.1 µg/ml to about 150 µg/ml, or in an amount of from about 1 µg/ml to about 100 µg/ml, or in an amount of from about 10 µg/ml to about 50 µg/ml.

In embodiments, the above solutions comprising the at least one molecule, component or substance, which may or may not have an influence on the concentration or appearance/emergence of a predetermined biomarker, may be perfused into an organ or tissue until a desired dosage (such as an effective dosage) of the at least one molecule, component or substance is present in the organ or tissue to prevent and/or protect against tissue damage. In embodiments, the above solutions comprising the at least one molecule, component or substance, which may or may not have an influence on the concentration or appearance/emergence of a predetermined biomarker, may be perfused into an organ or tissue until a homogeneous distribution of the at least one molecule, component or substance is present in the organ or tissue with the desired effect being that upon transplant, said organ, having been administered said at least one molecule, component or substance, is less likely to experience delayed graft function, deleterious effects of ischemia/re perfusion injury, such as inflammatory reactions, and/or other detrimental responses that can injure the organ or recipient including precipitating or enhancing an immunological reaction from the recipient with the potential of compromising the graft's and/or recipients short term and/or long term health and proper functionality.

In embodiments, at least one molecule, component or substance is administered by perfusion in an amount effective to prevent and/or protect against tissue damage. In embodiments, the at least one molecule, component or substance is administered by perfusion in an amount effective to prevent or substantially prevent delayed graft function, deleterious effects of ischemia/reperfusion injury, including inflammatory reactions, and/or other detrimental responses that can injure the organ or recipient. In embodiments, the at least one molecule, component or substance is administered by perfusion in an amount effective prevent or substantially prevent delayed graft function, deleterious effects of ischemia/reperfusion injury, including inflammatory reactions, and/or other detrimental responses that can injure the organ or recipient, which including precipitating or enhancing an immunological reaction from the recipient with the potential of compromising the graft's and/or recipient's short term and/or long term health and proper functionality.

In embodiments, the changes in the concentration of the at least one molecule, component or substance present in the solution may be made during perfusion in any manner, such as by way of a stepwise change, or gradient change in which a respective component's concentration is gradually increased to the desired concentration, or decreased to the desired concentration, or decreased to the point of elimination from the solution being perfused, if necessary.

In embodiments, the methods disclosed herein utilize a combination of technologies in HMP and HBS along with the merits of PFC oxygenation to generate a hybrid technique that solves the problems of static cold storage methods having a perfluorochemical layer. Selection of the baseline medium or perfusate in which to deliver the PFC as an emulsion also demands consideration of what will be optimal for the respective cell (e.g., pancreatic cells, cardiac cells, etc.,) preservation under hypothermic conditions. To this end, this disclosure includes the preparation of preservation solutions including at least one molecule, component or substance designed as hypothermic blood substitutes.

Hypothermic Blood Substitutes as Preservation Media:

Traditionally, a variety of organ preservation solutions have been developed. U.S. Pat. Nos. 5,643,712, 5,699,793, 5,843,024 to Brasile and U.S. Pat. No. 5,599,659, 5,702,881 to Brasile et al., the disclosures of each of which are incorporated herein by reference in their entireties, describe separate resuscitation and preservation solutions for tissues and organs. The Brasile patents disclose compositions to which at least one molecule, component or substance may be added, if desired, that may be used in methods of this disclosure.

Taylor et al. have formulated and evaluated two solutions designated Hypothermosol™-purge (HTS-P) and Hypothermosol™-maintenance (HTS-M). Some aspects of these solutions are described in U.S. Pat. Nos. 5,405,742 and 5,514,536 to Taylor, the disclosures of both of which are incorporated herein by reference in their entireties. The Taylor patents disclose compositions to which at least one molecule, component or substance may be added, if desired, that may be used in methods of this disclosure.

The protective properties of solutions such as the Unisol® family of solutions (as described in U.S. Pat. Nos. 6,492,103 and 6,994,954, entitled "System for organ and tissue preservation and hypothermic blood substitution" to Taylor, the disclosures of which are hereby incorporated by reference in their entireties) may be used in methods of this disclosure. In embodiments, Unisol may be mixed with at least one small or large molecule, component or substance intended to condition the organ and/or tissue, if desired, and may be utilized as the vehicle solution for emulsifying PFCs to significantly increase its oxygen delivery capacity, in addition to cytoprotective additives.

In embodiments, the perfusion solution may be a hyperkalemic, "intracellular-type" solution designed to "maintain" cellular integrity during hypothermic exposure at the nadir temperature (<10° C.). In embodiments, such a solution may comprise at least one small or large molecule, component or substance intended to condition the organ and/or tissue.

In embodiments, the composition of these baseline perfusates may be supplemented by adding small or large molecule biomarkers, such as cytoprotective agents. For example, such biomarkers may be additives displaying efficacy during low temperature preservation and therefore a high probability they will have a positive impact on the quality of donor organ preservation during machine perfusion, such as antioxidants, anti-apoptotic agents and trophic factors.

Antioxidants:

Oxygen-derived free radicals (ODFR) have been the focus of attention as mediators of various tissue injuries and particularly microvascular injury. It is possible for the production of injurious free radicals to be enhanced during cold storage, it is important to appreciate that the resultant cell damage may not occur entirely at the low temperature. On the contrary there is a growing body of evidence that reintroduction of oxygenation via a regular blood supply upon re-warming and reperfusion provides a powerful impetus for further oxidative stress. A principal pathway is the stimulation of enzymically driven radical reactions such as the xanthine/xanthine oxidase system involving the interaction of ATP catabolic products with molecular oxygen. Vascular endothelial cells are thought to be particularly vulnerable to this type of injury mediated by free radical generation by this so-called "respiratory burst" mechanism. Nevertheless, low concentrations of molecular oxygen such as that dissolved in organ preservation solutions may be sufficient to support the generation of free radicals during prolonged storage. Therefore, without the proper balance of antioxidants, cold exposure may set the stage for a progressive development of tissue injury as a result of reactions and processes that occur during hypothermia. The presence of molecules (or biomarkers) that emerge as a result of such reactions and processes in the donor cells and organs constitute one form of biomarker that may be monitored by the methods of the present disclosures (such biomarkers would include molecules produced as a result of such reactions and processes that occur during hypothermia and/or other conditions that may damage or make unsuitable to tissue or organ for transplant).

In embodiments, the antioxidant biomarkers may be present in a sufficient amount to substantially eliminate cellular damage and/or oxidative stress.

Whilst cells employ a number of repair mechanisms to recover from injuries occurring as a result of free radical activity, cell survival depends upon whether salvage pathways are overwhelmed or whether a point of irreversible damage is reached during the storage/reactivation process such that cell death becomes inevitable. Accordingly, in embodiments, the antioxidants, and amounts thereof, are selected to circumvent oxidative stress and reperfusion injury under both hypothermic and normothermic conditions. Exemplary antioxidant biomarkers may include dibutyryl-cAMP (db-cAMP), α-tocopherol (Vitamin E), Trolox™, and hypothermosol plus both EDTA and Vitamin E.

Anti-Apoptotic Agents:

While many of the diverse stresses known to cause necrotic cell death have also been reported to induce apoptosis in a variety of cells, the role of low temperatures as a possible stimulus of programmed cell death has only recently begun to emerge. It is now established that apoptosis plays an integral role in cell death induced by the rigors of both hypothermia and cryopreservation. More specifically, apoptosis has been identified to be directly associated with delayed-onset cell death (DOCD). This is defined as death associated with cold exposure that is not apparent immediately upon re-warming, but extending over the post-exposure recovery period. Recent research into the causative apoptotic and necrotic pathways responsible for low temperature induced DOCD has identified the contribution of multiple apoptotic pathways, including receptor- and mitochondrial-induced apoptosis. Investigations into these pathways, their progression, and their induction stressors has begun to facilitate new methods for improving preservation efficacy through the modulation of the cellular and molecular responses of a cell undergoing preservation (both hypothermic and cryopreservation).

Incorporation of specific apoptotic protease inhibitors in preservation media has now been reported to markedly improve the survival of a variety of cells and tissues. Furthermore, investigation into the modification of the carrier medium from that of standard extracellular-type culture media with, or without cryoprotectants, to that of specifically designed intracellular-type preservation solutions such as Unisol™, or its predecessor Hypothermosol, have led to studies showing significant improvement in preservation efficacy.

Anti-apoptotic biomarkers may be selected from those that possess recognized antioxidant activities and hence implied anti-apoptotic activity. For example, reduced glutathione is a component of both formulations as a multifaceted molecule that is also known to fulfill a natural role in the regulation of apoptosis, bongkrekic acid (BA) has been shown to be a potent inhibitor of mitochondrial permeability transition (PT) pores that form during apoptosis. In addition, BA can inhibit cytochrome c release that is influenced by Bax, a pro-apoptotic protein 85. BA, a stable inhibitor of PT, has been shown to increase cell viabilities and protein production levels following virus infection. With respect to the inhibition of caspases, a variety of compounds have been shown to be effective for mammalian cells in culture. Other exemplary compounds include, P35, which confers irreversible inhibition to a large number of caspases, and Z-VA-D.fmk (or its latest broad-spectrum counterpart, Q-VD-OPH), which has the ability to inhibit both the intrinsic and extrinsic pathways.

Trophic Factors:

Many cell signaling pathways retain activity at very low temperatures and can be affected by trophic factor administration. Trophic factor deprivation disrupts many aspects of cell function and is well known to induce apoptosis and cell death in a wide variety of cultured cells. Trophic factor supplementation (TFS) leads to a markedly improved outcome in kidney storage an influence cold ischemic injury by interaction with the tissue during cold storage and not merely by being present during re-warming and reperfusion. Exemplary tropic factor biomarkers, which may be employed include, for example, Insulin-like growth factor-1 (IGF-1) Epidermal growth factor (EGF), Bovine neutrophil peptide-1 (BNP-1), also referred to as bactenecin 98, Substance P (SP), which has mitogenic effects for a variety of cell types and stimulates DNA synthesis in ocular cell lines, EGF, a polypeptide growth factor (its effects may be additive or synergistic with other growth factors and cytokines), and insulin-like polypeptide growth factors (IGFs), such as IGF-1.

Increasing Oxygen Delivery to Tissues During Organ Procurement, Storage and/or Transplantation and the Role of PFCs:

The Unisol® "maintenance" solution was developed and tested at temperatures in the range of 7-10° C., which conforms with the temperature range in which ATP reserves can be re-established if an adequate supply of $O_2$ is maintained by continuous perfusion. For example, numerous investigations have suggested that oxygen supply is essential during hypothermic preservation of organs, such as livers.

The rapid depletion of adenine nucleotides during cold storage of organs at 0-2° C. (e.g. conventional static cold ice-storage) may be suggestive that mitochondrial function is severely impaired by hypothermia. These levels of $O_2$ may need to be sustained during perfusion to ensure the highest donor organs and the use of PFCs in the methods of the present disclosure may allow for this to be accomplished.

PFCs are hydrocarbons in which all or most of the hydrogen atoms are replaced with fluorine (e.g., perfluorocarbons). They have twice the density of water and a high capacity for dissolving respiratory gases. The solubility of dissolved oxygen in PFC is approximately 25 times greater than in blood or water. The ability of PFCs to release oxygen in accordance with Henry's Law is not significantly influenced by temperature, making them ideal for delivering oxygen during hypothermic organ preservation. This is also supported by recent demonstrations that the gas-dissolving and gas-unloading properties of perfluorocarbon were necessary in a peritoneal perfusion application for systemic oxygenation since the same effect was not obtained when saline solution alone was employed as the perfusate.

In embodiments, the PFCs may possess one or more of the following qualities: (1) the ability to dissolve large quantities of many gases, (2) can transport these gases to diffuse across distances, (3) are non-toxic, (4) biologically inert, (5) biostatic liquids at room temperature. In embodiments, PFCs with densities of about 1.5-2.0 g/mL and high solubilities for oxygen and carbon dioxide may be selected.

In embodiments, for a variety of reasons, such as preservation and transport, the donor tissue may be cooled to a sufficient temperature to attenuate metabolism, such as a temperature of from about 15° C. to about −20° C., such as from about 10° C. to about −10° C., or from about 10° C. to about 0° C. In embodiments, the cooling rate may be from about 0.5° C./min. to about 5° C./min. In embodiments, freezing and/or cooling the donor tissue may occur at a cooling rate of from about PC/min. to about 20° C./min., such as from about 6° C./min. to about 15° C./min.

In embodiments, the rate of cooling the donor tissue coupled with a rapid warming rate (such as the above rates for cooling multiplied by a factor of at least 1.5, such as a factor in the range from 1.5 to 10, such as a factor of 2, or 3, or 4, or 5) during warming of the donor tissue. Warming of the donor tissue may be achieved by, in embodiments, direct immersion in a warm medium, such as an osmotically-buffered medium.

Examples of other additives that may be used are listed in Table 3, although many other additives can be used.

Exemplary solutions to which at least one molecule, component or substance may be added for a clinical organ preservation program are summarized in Table 1.

TABLE 1

Solution Design Strategy for Clinical Organ Preservation Program

| Application Phase | Temperature Range | Base Solution Type | Additives |
|---|---|---|---|
| Organ Preparation in situ/ex vivo purge | 10-37° C. | Extracellular | Purging cocktail |
| Organ Maintenance cold flush | 0-4° C. | Intracellular (High K) | Protection/Maintenance cocktail |
| Organ Maintenance cold machine perfusion or cardiopulmonary bypass | 5-15° C. | Intracellular (High K or Na) | Protection/Maintenance cocktail |
| Organ Rescue warm machine perfusion | 30-37° C. | Extracellular | Rescue cocktail |
| Organ Pre-reimplantation ex vivo rinse | 30-37° C. | Extracellular | Plasma-like |

TABLE 2

Formulation of unified solution system
Intracellular Base (High Potassium)

| | |
|---|---|
| $Na^+$ | 62.5 mM |
| $K^+$ | 70 mM |
| $Ca^{2+}$ | 0.05 mM |
| $Mg^{2+}$ | 15 mM |
| $Cl^-$ | 30.1 mM |
| $H_2PO_4$ | 2.5 mM |
| $HCO_3^-$ | 5 mM |
| HEPES | 35 mM |
| Lactobionate | 30 mM |
| Gluconate | 70 mM |
| Sucrose | 15 mM |
| Mannitol | 25 mM |
| Dextran - 40 | 6% |
| Glucose | 5 mM |
| Adenosine | 2 mM |
| reduced Glutathione | 3 mM |

TABLE 3

Exemplary Biochemical and Pharmacological
Additives for Preservation Media

| Classification | Examples |
|---|---|
| Anti-platelet aggregation/vasoactive agents | Prostacyclin, Prostaglandin E-1 (PGE1), $Mg^{2+}$ |
| Calmodulin inhibitors | Chlorpromazine (CPZ), trifluoperazine |
| Calcium Channel Blockers | Nicardipine, nifedipine, verapamil, CPZ |
| Protease and phospholipase inhibitors | CPZ, verapamil, calpain antagonists |
| Anti-oxidants/free radical scavengers | Glutathione, catalase, super oxide dismutase (SOD), allopurinol, dimethylthiourea, vitamin-E (or Trolox), magnesium ascorbyl phosphate, Lazaroids |

TABLE 3-continued

Exemplary Biochemical and Pharmacological Additives for Preservation Media

| Classification | Examples |
| --- | --- |
| Anti-apoptotic agents | cycloheximide |
| Iron chelators | Desferroxamine |
| Membrane Stabilizers | CPZ, Dexamethosone, trehalose |
| "Cytoprotective" agents | PGE1, glycine |
| Metabolic Substrates: | |
| Sugars | glucose, fructose, ribose |
| Nucleotide precursors (HEP enhancers) | Adenine, Adenosine, Fructose diphosophate, Glyceraldehyde-3-phosphate |
| Oxygen-carriers | Perfluorocarbons, PEG-hemoglobin |
| Trophic Factors | Growth factors, nucleic acid derivatives, ribonucleotides, glycosaminoglycans |
| Cryoprotective Additives (CPA) | Dimethylsulfoxide (DMSO), glycerol, propanediol, ethylene glycol, butanediol, polyvinylpyrrolidone (PVP), hydroxyethyl starch (HES), polyethylene glycol (PEG) |

A substantial number of improvements in the combinations of components and their respective concentrations have been incorporated in the design of the compositions and systems of the methods of the present disclosure over that of the known art, including Hypothermosol™.

Exemplary aqueous formulations of both intracellular and extracellular base solutions into which at least one molecule, component or substance (and other additives) may be added are illustrated below. The formulations can contain substantially about the amounts listed.

Exemplary Intracellular Base Solutions
    Ionic
    40-80 mM $Na^+$;
    50-90 mM $K^+$;
    0.01-0.1 mM $Ca^{++}$;
    5-25 mM $Mg^{++}$;
    20-40 mM $Cl^-$;
    pH Buffers
    1-5 mM $H_2PO_4$;
    3-7 mM $HCO_3$;
    25-50 mM HEPES;
    Impermeants
    25-50 mM Lactobionate;
    10 mM-1M Sucrose;
    15-30 Mannitol;
    1-10 Glucose;
    50-100 Gluconate;
    Colloids
    6% Dextran 40;
    Pharmacologics
    0.1-2 mM Adenosine; and
    1-5 mM Glutathione.
High Potassium Exemplary Intracellular Base Solution
    Ionic
    62.5 mM $Na^+$;
    70.0 mM
    0.05 mM $Ca^{++}$;
    15.0 mM $Mg^{++}$;
    30.1 mM $Cl^-$;
    pH Buffers
    2.5 mM $H_2PO_4$;
    5.0 mM $HCO_3$;
    35.0 mM HEPES;
    Impermeants
    30.0 mM Lactobionate;
    15.0 mM Sucrose;
    25.0 mM Mannitol;
    5.0 mM Glucose;
    70.0 mM Gluconate;
    Colloids
    6% Dextran 40;
    Pharmacologics
    2.0 mM Adenosine; and
    3.0 mM Glutathione.

This exemplary Intracellular Base Solution has an osmolality (mOsm/Kg) of 350, a pH of about 7.6, and a $[K^+]$ $[Cl^-]$ of about 2100.

Low Potassium Exemplary Intracellular Base Solutions
    Ionic
    100-150 mM $Na^+$;
    15-40 mM $K^+$;
    0.01-0.1 mM $Ca^{++}$;
    5-25 mM $Mg^{++}$;
    20-40 mM $Cl^-$;
    pH Buffers
    1-5 mM $H_2PO_4$;
    3-7 mM $HCO_3$;
    25-50 mM HEPES;
    Impermeants
    25-50 mM Lactobionate;
    10 mM-1M Sucrose;
    15-30 mM Mannitol;
    1-10 mM Glucose;
    50-100 mM Gluconate;
    Colloids
    6% Dextran 40;
    Pharmacologics
    0.1-2 mM Adenosine; and
    1-5 mM Glutathione.
Exemplary Low Potassium Intracellular Solutions
    Ionic
    125 mM $Na^+$;
    25.0 mM
    0.05 mM $Ca^{++}$;
    15.0 mM $Mg^{++}$;
    30.1 mM $Cl^-$;
    pH Buffers
    2.5 mM $H_2PO_4$;
    5.0 mM $HCO_3$;
    35.0 mM HEPES;
    Impermeants
    30.0 mM Lactobionate;
    15.0 mM Sucrose;
    25.0 mM Mannitol;
    5.0 mM Glucose;
    70.0 mM Gluconate;
    Colloids
    6% Dextran 40;
    Pharmacologics
    2.0 mM Adenosine; and
    3.0 mM Glutathione.
Exemplary Extracellular Base Solutions
    Ionic
    120-160 mM $Na^+$;
    3-9 mM $K^+$;
    1-3 mM $Ca^{++}$;
    1-10 mM $Mg^{++}$;
    100-150 mM $Cl^-$;
    1-10 mM $(SO_4)^{2-}$;
    pH Buffers
    1-3 mM $H_2PO_4$;
    20-30 mM $HCO_3$;
    5-15 mM HEPES;

Impermeants
5-10 mM Glucose;
Colloids
6% Dextran 40;
Pharmacologics
0.1-2 mM Adenosine; and
1-5 mM Glutathione.

Exemplary Extracellular Base Solution
Ionic
141.2 mM $Na^+$;
6.0 mM $K^+$;
1.5 mM $Ca^{++}$;
5.0 mM $Mg^{++}$;
122.0 mM $Cl^-$;
1.0 mM $SO_4^-$;
pH Buffers
1.2 mM $H_2PO_4$;
25.0 mM $HCO_3$;
25.0 mM HEPES;
Impermeants
5.0 mM Glucose;
Colloids
6% Dextran 40;
Pharmacologics
1.0 mM Adenosine; and
3.0 mM Glutathione.

This exemplary extracellular base solution has an osmolality (mOsm/Kg) of 315, a pH of about 7.5, and a $[K^+][Cl^{31}]$ of about 732.

As outlined above, the strategic designs of solutions used for organ preservation have differed depending upon their ultimate use, either as perfusates for continuous, or intermittent, perfusion of the organ. As a unique approach, the methods of the present disclosure, which include the addition of at least one molecule, component or substance to the various solutions described herein, have been developed with a view to improving techniques that may be used for machine perfusion preservation. An attempt has been made to combine the main characteristics of effective solutions, such as hypothermic solutions, in the formulation of the base solution (which includes at least one small or large molecule, component or substance intended to condition the organ and/or tissue), and wherever possible, components, including, inter alia, small or large molecule, component or substance intended to condition the organ and/or tissue, that might fulfill multiple roles have been selected. For example, an extracellular base solution comprising at least one molecule, component or substance may be combined with various different additives to form purging solutions, organ rescue solutions, pre-implantation rinses and the like. This strategy maximizes the intrinsic qualities of the machine perfusion preservation process.

The methods of the present disclosure comprise administering to the donor organ in need thereof an effective amount of one or more of the compositions described herein in order to influence the presence or abundance of a predetermined biomarker. The composition may be administered directly to the tissue or organ.

For example, the methods described herein may further comprise the step of contacting the tissue or organ with an amount of a lipid emulsion effective to avoid damage to an organ during perfusion while monitoring, sustaining and/or restoring the viability of the organ and preserving the organ for storage and/or transport, such as by reversing the effect of the amphipathic compound that inhibits metabolism on the tissue or organ. Typically, the tissue or organ may be contacted with the lipid emulsion prior to transplantation into a host. Alternatively, contacting the tissue or organ with the lipid emulsion may occur after transplantation into a host. Of course, the tissue or organ may be contacted with the lipid emulsion during the transplantation procedure as well as before, during and after the transplantation into a host.

In embodiments, suitable solutions may contain reversible metabolic inhibitors to protect tissues and organs from the effects of acidosis, oxidative damage, ischemia and reperfusion injury while the organ is removed from the normal body circulation. By reversible, it is meant that the metabolic inhibitory activity of the compound or composition on the tissue or organ can be inhibited or removed by contacting the tissue or organ with a second compound or composition. Reversible metabolic inhibitors may include amphipathic compounds, which are reversible by removal or inactivation by a lipid emulsion. In embodiments, the amphipathic metabolic inhibitor is a local anesthetic. Exemplary local anesthetics may possess an aliphatic side chain making the anesthetic lipophilic and able to penetrate the cell membrane. Exemplary anesthetics include, but are not limited to, bupivacaine, levo-bupivacaine, etidocaine, ropivacaine, and tetracaine.

Organs and/or tissues treated with an effective amount these reversible metabolic inhibitors can withstand severe hypoxia, e.g. because of impaired arterial perfusion, without developing the expected tissue acidosis. After a period of time, the metabolic and other effects of the local anesthetic on the tissue or organ can be reversed, e.g., by administration of a lipid infusion. In embodiments, the lipid infusions are suitable for injection and comprise lipid droplets of such size that they can cross the capillary bed without restricting blood flow. Examples include emulsions of soybean oil or other sources of triglycerides.

In embodiments, the methods further comprise the step of administering an amount of a lipid emulsion effective to reverse the effect of the amphiphilic agent (e.g., lipophilic local anesthetic) on the tissue or organ. Exemplary lipid emulsions that may be used in the methods of the present disclosure include U.S. Pat. Nos. 5,286,718; 5,585,399; 7,560,486; and U.S. Patent Application Publication Nos. 2002/0094949, 2004/0038891 and 2006/0166182, which are incorporated by reference in their entirety.

The perfusion solution may be provided in a perfusion solution kit, for example, a saleable package preferably containing at least one first container holding a first perfusion solution for a first temperature mode of perfusion and at least one second container holding a second, different perfusion solution for a second temperature mode of perfusion (which may or may not be the same temperature as the first temperature mode, optionally the box 10 shown in FIG. 2.

The first perfusion solution may contain at least one oxygen carrier as discussed above. The second perfusion solution may optionally be non-oxygenated, and/or may contain at least one biomarker that is selected based on information relating to (1) one or more qualitative and/or quantitative relationships of one or more predetermined biomarkers that were monitored while at least one same or different organ were preserved, transported and/or stored in at least one device selected from an organ transporter, perfusion apparatus, cassette, and organ diagnostic apparatus, and (2) events occurring while at least one same or different organ was transported and/or stored in a least one same or different device, where the information is cross-referenced to outcome data relating to outcomes of transplantation of the at least one same or different organ that was transported and/or stored.

In embodiments, such a solution may be made such that it contains no more than 5 mM of dissolved pyruvate salt. Also, the first container and the second container may be configured to be operably connected to a perfusion machine as perfusion fluid reservoirs in fluid communication with perfusate conduits of said perfusion machine. Further, one of the first and second containers may be compressible to apply pressure to the perfusion solution therein. Furthermore, at least one of the first and second containers may include a first opening for passage of a contained perfusion solution out of the container and a second opening passage of a compressed gas into the container. The package may be a cassette configured to be operably connected to a perfusion machine for connection of the first and second containers within the cassette in fluid communication with perfusate conduits or tubing of the perfusion machine.

In other embodiments, the perfusion solution kit may contain at least one first container holding a first perfusion solution for perfusion at a first temperature and at least one second container holding a second, different perfusion solution for perfusion at a second temperature lower than the first temperature. In embodiments, the first and second temperature that are selected based (at least in-part) on information relating to (1) one or more qualitative and/or quantitative relationships of one or more predetermined biomarkers that were monitored while at least one same or different organ were preserved, transported and/or stored in at least one device selected from an organ transporter, perfusion apparatus, cassette, and organ diagnostic apparatus, and (2) events occurring while at least one same or different organ was transported and/or stored in a least one same or different device, where the information is cross-referenced to outcome data relating to outcomes of transplantation of the at least one same or different organ that was transported and/or stored.

In addition, the first and/or second perfusion solution may, if desired, contain at least one biomarker that is selected based (at least in-part) on information relating to (1) one or more qualitative and/or quantitative relationships of one or more predetermined biomarkers that were monitored while at least one same or different organ were preserved, transported and/or stored in at least one device selected from an organ transporter, perfusion apparatus, cassette, and organ diagnostic apparatus, and (2) events occurring while at least one same or different organ was transported and/or stored in a least one same or different device, where the information is cross-referenced to outcome data relating to outcomes of transplantation of the at least one same or different organ that was transported and/or stored. In embodiments, the second solution contains no more than 5 mM of dissolved pyruvate salt. As above, the first container and the second container may be configured to be operably connected to a perfusion machine as perfusion fluid reservoirs in fluid communication with perfusate conduits of said perfusion machine. Further, one of the first and second containers may be compressible to apply pressure to the perfusion solution therein. Furthermore, at least one of the first and second containers may include a first opening for passage of a contained perfusion solution out of the container and a second opening passage of a compressed gas into the container. The package may be a cassette configured to be operably connected to a perfusion machine for connection of the first and second containers within the cassette in fluid communication with perfusate conduits or tubing of the perfusion machine.

The medical fluid within reservoir 10 may be brought to a predetermined temperature by a first thermoelectric unit 30a in heat transfer communication with the reservoir 10.

A temperature sensor T3 relays the temperature within the reservoir 10 to the microprocessor 150, which adjusts the thermoelectric unit 30a to maintain a desired temperature within the reservoir 10 and/or displays the temperature on a control and display areas 5a for manual adjustment. Alternatively or in addition, and preferably where the organ perfusion device is going to be transported, the medical fluid within the hypothermic perfusion fluid reservoir can be cooled utilizing a known cryogenic fluid heat exchanger apparatus.

An organ chamber 40 is provided which supports a cassette 65, as shown in FIG. 2. Sensors in transporter can detect the presence of cassette in the transporter, and depending on the sensor, can read the organ identity from a barcode or radio frequency or other smart tag that may be integral to cassette 65. This allows for automated identification and tracking of the organ and helps monitor and control the chain of custody. A global positioning system may be added to transporter and/or cassette 65 to facilitate tracking of the organ. The transporter can be interfaced to a computer network by hardwire connection to a local area network or by wireless communication while in transit. This interface allows perfusion parameters, vascular resistance, and organ identification and transporter and cassette location to be tracked and displayed in real-time or captured for future analysis.

Various known data structures and information connections may be used to assist in the overall communication and data transfers that may be beneficial before, during and after organ transplantation. The perfusion apparatus, transporter, cassette, and organ diagnostic apparatus may be networked to permit remote management, tracking and monitoring of the location and therapeutic and diagnostic parameters of the organ or organs being stored or transported. The information systems may be used to compile historical data of organ transport and storage, and provide cross-referencing with hospital and UNOS data on the donor and recipient. The systems may also provide outcome data to allow for further development and selection of biomarkers and perfusion parameters with respect to transplant outcomes.

The data record may include information regarding the donor, which may be entered at the location where an organ is recovered from a donor. Information may also be directly recovered from the perfusion, diagnostic or transporter apparatus to monitor organ status and location. Various types of information may be grouped into sub-records or sub-directories to assist in data management and transfer. All the sub-records may be combined to form an overall transplant record, which may be disseminated to or retrievable by physicians, scientists or other organizations for tracking and monitoring purposes.

In embodiments, transporter can automatically log much or all of the perfusion process data, biomarker data and transporter events into an internal database. A radio frequency or barcode labeled tag or the like for each cassette allows transporter to reference the data uniquely to each organ. When the transporter reaches a docking port, the transporter can upload data to a main database computer over a LAN. Transporter can also provide real-time status whenever transporter is connected to the LAN. The transporter may also be configured with a wireless communications setup to provide real-time data transfer during transport. Perfusion apparatus may also be connected to the LAN and data uploads can occur continuously and in real-time. The data can be cross-referenced with UNOS data to utilize the UNOS data on organ identification, donor condition, donor logistics, recipient logistics and recipient outcomes. Data may be displayed and accessed on the Internet to facilitate monitoring from any location.

Within the perfusion, diagnostic and/or transporter apparatus, the organ bath may be cooled to a predetermined temperature by a second thermoelectric unit 30b, as shown in FIG. 2, in heat transfer communication with the organ chamber 40. Alternatively, where the organ perfusion device is going to be transported, the medical fluid within reservoir 10 can be cooled utilizing a heat transfer device such as an ice and water bath or a cryogenic fluid heat exchanger apparatus. For example, a temperature sensor T2 within the organ chamber 40 relays the temperature of the organ 60 to the microprocessor 150, which adjusts the thermoelectric unit 30b to maintain a desired organ temperature and/or displays the temperature on the control and display areas 5c for manual adjustment.

In the methods of the present disclosure, conventional medical fluid bags and tubing connections may be utilized. All tubing may be disposable, easily replaceable and interchangeable. Further, all tubing may be formed of or coated with materials compatible with the medical fluids used, such as non-thrombogenic materials. The tubing may be connected to the organ(s) with conventional methods, for example, with sutures. The tubing may include a lip to facilitate connection to the organ. Alternatively, cannulas may be used with or without connection to an organ chair. However, the specific methods and connection depend on the type of organs(s) to be perfused.

A bubble detection system may be installed to sense bubbles in the perfusate. An air sensor and sensor board are preferably used. The output of the sensor activates a debubbler system, such as an open solenoid valve, to rid bubbles from the perfusate flow prior to organ introduction. As with all of the sensors and detectors in this system, the bubble detector may be positioned at any point in the system that is effective based on the particular parameters or design characteristics of the system. For example, a bubble detector and debubbler system BD may be positioned between the cam valve 205 and pressure sensor P1, as shown in FIG. 1.

An exemplary oxygenator may be a two stage oxygenator that may include a hydrophilically coated low porosity oxygen permeable membrane. A portion of the medical fluid may be diverted to a sensor in order to sense fluid characteristics and biomarker levels, which may be indicative of an organ's viability. Such sensors are in communication with the microprocessor 150 and allows the organ's viability to be assessed either automatically or manually. In embodiments, one of two gases, such as 100% oxygen and 95/5% oxygen/carbon dioxide, is placed on the opposite side of the membrane depending on the pH level of the diverted medical fluid. Alternatively, another pump (not shown) may be provided which pumps effluent medical fluid out of the organ chamber 40 and through a sensor before returning it to the bath, or the viability sensor can be placed on any tubing through which the solution being perfused passes. In embodiments, the fluid characteristics may be analyzed in known separate diagnostic apparatus and/or analyzers.

The sensed fluid characteristics and the monitoring of biomarkers may be used to analyze and determine an organ's viability. The characteristics may be analyzed individually or multiple characteristics may be analyzed to determine the effect of various factors. The characteristics may be measured by capturing the venous outflow of the organ and comparing its chemistry to the perfusate inflow. The venous outflow may be captured directly and measured or the organ bath may be measured to provide a rough approximation of the fluid characteristics for comparisons over a period of time.

In embodiments, an organ viability index may be provided, which takes into account one or more of the various monitored biomarkers identified above. The organ viability index may be organ specific, or may be adaptable to various organs. The organ viability index may compile the monitored parameters and biomarkers into a diagnostic summary, which to be used for making organ therapy decisions and deciding whether to transplant the organ. The organ viability index may be automatically generated (in real time) and provided to the physician. The organ viability index may be computer generated via a connection to the perfusion apparatus, transporter, cassette and/or organ diagnostic apparatus. The additional information, such as donor specific information, may be entered into a single computer at the site of the perfusion apparatus, transporter, cassette and/or organ diagnostic apparatus or may be entered in a remote computer and linked to the perfusion apparatus, etc. In embodiments, the organ viability index may be made available over a computer network such as a local area network or the Internet for quick comparison, remote analysis and data storage.

The organ viability index provides measurements and normal ranges for each biomarker. For example, at approximately 5° C., normal pH may be from 7.00 and 8.00, such as from 7.25 and 7.75, or from 7.50 and 7.60 and base excess may be in the range of from −10 to −40, such as from −15 to −30, or from −20 to −25. Measurements that are outside the normal range may be restored to values that are characteristic of an organ suitable for transplantation during preservation and/or during transport by perfusing the donor organ or tissue with a selected perfusate that will result in the biomarker value or measurement returning to within the predetermined acceptable normal range.

The index may also provide identifying information, such as age, gender, blood type of the donor and any expanded criteria; organ information, such as organ collection date and time, warm ischemia time, cold ischemia time and vascular resistance; apparatus information, such as flow rate, elapsed time the pump has been operating and pressure; and other identifiers such as UNOS number and physician(s) in charge. The index may additionally provide temperature corrections if desired.

Known organ diagnostic systems, sensors, biopsy methods, and analysis methods may be used to monitor one or more biomarkers. Such systems, sensors, biopsy methods, and analysis methods may employ a computer and an analyzer. Connected to both computer and analyzer may be a known organ evaluation instrument. Exemplary organ diagnostic systems may be provided with suitable displays to show the status of the system and the organ. Organ evaluation instruments may have a perfusate chamber and an organ chamber. Optionally, the analyzer and organ evaluation instrument are connected. Exemplary organ diagnostic systems would provide analysis of an organ and may be connected to the control system microprocessor and may produce an organ viability index quickly.

The organ viability index may be produced by flow and temperature programmed single-pass perfusion and in-line automatic analysis. The analysis may be performed in a multi-pass system, although a beneficial aspect of the single-pass system is that it can be configured with a limited number of sensors and requires only enough perfusate to perform the analysis. Single-pass perfusion also allows for an organ inflow with a perfusate having a known and predetermined chemistry. This increases the flexibility of types and contents of perfusates that may be delivered, which can be tailored and modified to the particular analysis in process.

An exemplary organ evaluation instrument may have a perfusate chamber and an organ chamber. Organ chamber may optionally be insulated and include a lid that may be removable or may be hinged. Such an organ chamber may be configured to receive an organ-containing cassette, optionally without opening cassette or jeopardizing the sterility of the interior of the cassette.

In embodiments, methods according to the present disclosure may utilize apparatus such as that discussed above to perfuse an organ to sustain, monitor and/or restore the viability of an organ and/or to transport and/or store the organ. Preservation of the viability of an organ is a key factor to a successful organ transplant. Organs for transplant are often deprived of oxygen (known as ischemia) for extended periods of time due to disease or injury to the donor body, during removal of the organ from the donor body and/or during storage and/or transport to a done body.

The methods of the present disclosure utilize perfusion, diagnostic, and/or transporter apparatus that have the ability to detect and monitor one or more biomarkers, such as at least two, three, four, five, . . . ten biomarkers. In embodiments, monitoring one or more biomarkers provides data that may be compared with information compiled in a database regarding the same or different biomarkers, such that the optimum cellular chemistry of an organ to be transplanted may be manipulated and adjusted (in real time) in response any respective biomarker measurement that is outside of a predetermined range. The monitoring of one or more predetermined biomarkers and their quantitative and/ or qualitative relationships may alert the those transporting and/or preserving the donor organ that a specific perfusate may be necessary to repair the organ and restore the organs viability before irreversible damage occurs, such as cell death, ischemic damage to the organ and/or reperfusion injury. Alternatively, either before or after a determination is made that the organ is suitable for transplant, the donor organ may be exposed to a perfusate containing one or more biomarkers designed to condition the organ with the desired effect being that upon transplant, said organ, having been administered said perfusate, is less likely to experience delayed graft function, deleterious effects of ischemia/reperfusion injury, including inflammatory reactions, and/or other detrimental responses that can injure the organ or recipient including precipitating or enhancing an immunological reaction from the recipient with the potential of compromising the graft's and/or recipients short term and/or long term health and proper functionality while monitoring, sustaining and/or restoring the viability of the organ and preserving the organ for storage and/or transport. Such methods of the present disclosure may prevent apoptosis or programmed cell death. Additionally, the perfusion and distribution of such biomarkers in an organ by the perfusion, diagnostic and/or transporter apparatus, under conditions controlled by the particular apparatus, may interrupt, decrease and/or reverse apoptosis.

In embodiments, the methods of the present disclosure, an organ or tissue may be treated ex vivo by mechanical, physical, chemical or genetic manipulation and/or modification to treat disease and/or treat damage to and/or enhance the properties of the organ or tissue. An organ or tissue sample may be removed from a first body, modified, treated and/or analyzed outside the first body and either returned to the first body or transplanted to a second body. An advantage of the methods of the present disclosure is that they enlarge the time that an organ may be available for ex vivo treatment, e.g., for hours or even days or weeks.

In embodiments, the methods of the present disclosure may be used to provide particular solution containing chemicals and/or biomarkers to an organ or tissue or may be used to perform particular treatments including flushing or washing an organ or tissue with particular solution containing chemicals and/or biomarkers. Ex vivo treatments may be performed on tissue or an organ to be transplanted or may be performed on tissue or an organ that has been removed from a patient and is to be returned to the patient after the desired procedure is performed. Ex vivo treatments include but are not limited to treatment of tissue or an organ that has endured a period or periods of ischemia and/or apoxia. Ex vivo treatments may involve performing surgical techniques on an organ, such as cutting and suturing an organ, for example to remove necrotic tissue. Any surgical or other treatment technique that may be performed on tissue or an organ in vivo may also be performed on tissue or an organ ex vivo. The benefit of such ex vivo treatment may be seen, for example, in the application of radiation or chemotherapy to treat a tumor present in or on an organ, to prevent other portions of the patient from being subjected to extraneous radiation or chemotherapy during treatment. The perfusion and transporter apparatus of the present disclosure also provide additional time for a physician to maintain the tissue or organ before, during and/or after performing a particular technique on the tissue or organ.

Another concern with organ transplantation is the degree to which a recipient may be medicated to prevent organ rejection. In organ transplantation, a further ex vivo technique involves modifying the organ to avoid having it activate the immune system of the donee to prevent or reduce organ rejection and to limit or prevent the need to suppress the donee's immune system before, during and/or after organ transplantation so as to increase the tolerance of the donee to the transplanted organ. Modifications of an organ may, for example, encourage the donee body to recognize the transplanted organ as autologous. The methods of the present disclosure may be used to deliver biomarkers such as chemical compounds, natural or modified antibodies, immunotoxins, stem cells such as mesenchymal stem cells, or the like, to an organ and may assist the organ to adsorb, absorb or metabolize such substances to increase the likelihood that the organ will not be rejected. These substances may also mask the organ by blocking, killing, depleting and/or preventing the maturation of allostimulatory cells (dendritic cells, passenger leukocytes, antigen presenting cells, etc.) so that the recipient's immune system does not recognize it or otherwise recognizes the organ as autologous. An organ may be treated just prior to transplantation or may be pretreated hours, days or weeks before transplantation.

For example, biomarkers, such as modified or unmodified immunoglobulin, steroids and/or a solution containing polyethylene glycol (PEG) and an antioxidant such as glutathione, may also be provided to an organ or tissue to mask the organ or to treat the onset of intimal hyperplasia during cryopreservation and/or organ or tissue transplantation. These solutions may be provided to an organ or tissue by perfusion, diagnostic and/or transporter apparatus of the present disclosure.

The methods of the present disclosure may be used in conjunction with the above techniques and methods and/or in conjunction with further techniques and methods, to perform research on an organ or tissue. Since the organ or tissue may be maintained and/or analyzed at or near physiologic parameters, an organ may be tested for the effects of various treatments and/or substances on the organ or tissue ex vivo. The methods of the present disclosure may be used to perfuse a fluid containing a biomarker through an organ while monitoring the organ and the organ outflow to analyze the condition of the organ and/or to determine the effect on it of the various treatments.

In embodiments, both the perfusate flow and the temperature regulation can be automatically controlled in order to optimize results. Such automatic control allows a rapid and reliable response to perfusion conditions during operation. Automatic flow control can be based on the parameters measured from the system, including the perfusate flow rate, the perfusate pH exiting the organ, the organ inlet pressure or timed sequences such as pre-selected flow rates or switching between perfusate modes. In embodiments, the flow control is based on pressure monitoring of the perfusate inflow into the organ. The benefits of automatic flow control include maintaining proper oxygenation and pH control while operating under continuous flow or controlled intermittent flow.

The automatic control may be effected by a known interactive control program. The parameters may be pre-stored for selection by a user or programmed by the user during operation of the system. The control program is preferably implemented on a programmed general purpose computer.

The control system may be manually adjusted at any time or set to follow default settings. The system includes a logic circuit to prevent the operator from setting parameters that would compromise the organ's viability. As noted above, the system may also be operated in a manual mode for sequential hypothermic and/or normothermic perfusion, as well as in the computer controlled mode for sequential hypothermic and/or normothermic perfusion.

The above methods may be used for mammal organs, including human child or small organs as well as for large or adult organs with modification as needed of the cassettes and or of the pressures and flow rates accordingly. As previously discussed, the organ cassette(s) can be configured to the shapes and sizes of specific organs or organ sizes.

EXAMPLES

As discussed above, one of the potential biomarkers that may be monitored is the level of oxygen (which may be assessed, for example, by monitoring the $pO_2$ and/or stability of the $pO_2$, the oxygen consumption rate and/or stability of the oxygen consumption rate). The level of oxygen may contribute to many other biomarkers that may be monitored such as the metabolism of the organ and/or stability of the metabolism rate; monitoring the glucose concentration and/or stability of the glucose concentration; monitoring the consumption/consumption rate of glucose; monitoring the creation of lactic acid; monitoring the lactate concentration; monitoring the pH and/or stability of the pH, etc.

The selection of oxygen as a biomarker and thus the monitoring of oxygen levels and/or oxygenation during perfusion is based upon the fact that the biochemical processes constituting metabolic activity are still active, albeit at a much lower level. For organs, such as the liver, where the temperature is in the range from about 0 to about 42° C. tissue oxygen consumption may decrease by at least 50% for each 10° C. fall in temperature. Even where the temperature is in the range of from about 4 to about 6° C. a continuous supply of oxygen during hypothermic machine perfusion may be used to maintain the organ's viability because approximately 7% of the organ's metabolic activity may persists at 4-6° C.

The short duration of acceptable preservation time on ice limits the availability of livers for transplantation (although the present example relates to livers, other organs may also be used in the methods of the present disclosure). Although a cold ischemic time limit of 24 hours exists for current clinical liver transplantation, surgeons prefer shorter periods, preferably <12 hours to reduce the incidence of delayed graft function. This has several negative consequences: (1) It limits the availability of livers because it limits the geographic area for organ harvest to a region near to the recipient; (2) It creates stress on transplant teams, which may itself discourage vigorous pursuit of available organs; (3) The brief preservation time does not provide enough time to evaluate livers from marginal donors and new interventions that could expand the donor pool size; (4) Even with a brief static cold preservation time, there is an enduring negative impact on the graft; and (5) Perhaps most important, the liver is used in a small geographic area resulting in sub-optimal donor to recipient matching.

Much better HLA matching could be performed if livers could be transported for longer periods of time because we would be matching the donor against a larger pool of potential recipients. With respect to all transplants in general, the more time the organ is viable the increased chances of finding a better match for the organ being transplanted, which may also result in better patient outcomes.

The following studies used livers obtained from porcine donors at the Medical University of South Carolina. An adapted LifePort kidney transporter platform was used in the present examples and modified as discussed below. The following examples demonstrate that the overall tissue viability was notably improved, as measured by oxygen consumption levels, and the alanine aminotransferase levels were significantly less than in SCS livers. The liver transporter (LTR) was designed to be capable of maintaining a porcine liver for at least 24 hours. The LTR was designed for the following experiments with many of the clinically successful Kidney transporter (KTR) characteristics (Table 4). The KTR is an electrically or battery-powered, hypothermic perfusion renal transportation device. The organ is supported in a double sealed, sterilized, single-use, disposable cassette/tube-set that maintains sterility for the entire storage and transport period. A passively insulated, leak-tight, ice-bath provides the coolant source. Heat is conducted from the walls of the perfusate reservoir and organ cassette into the ice bath enabling control within the desired temperature range. A microprocessor controller maintains the selected kidney perfusion pressure and manages KTR operation. Pressure, temperature and other sensors allow the controller to maintain proper operation and they audibly alert the user if a fault is detected. Data displayed includes perfusate temperature and flow rate, arterial pressures (systolic, mean & diastolic) and calculated renal resistance. Several changes to the bench top prototype were made during Phase I including the design of the cassette and the disposable tube sets.

The following chart (Table 4) outlines the exemplary specifications for the LTR compared with the existing marketed KTR specification and describes modifications that may be employed to bring the LifePort kidney transporter into harmony with each requirement.

TABLE 4

Exemplary Liver Transporter Specifications

| Specification for Liver Preservation Device | Performance of Existing KTR | Engineering Steps Required to Convert the Existing KTR into a Liver Preservation Device |
|---|---|---|
| Physically accommodate the liver within organ cassette and the cassette within the device housing | Cassette sized to fit a kidney | Provide a cassette sized to fit a liver with an appropriately sized housing to fit the liver cassette |
| Temperature range | 1 to 8° C., cooled by ice | No changes required |
| Perfuse the portal vein and the hepatic artery independently at constant imposed systolic pressures: Deliver 0-500 mL/minute at up to 8 mmHg to the portal vein. Deliver 0-120 mL/minute at up to 25 mmHg to the hepatic artery. | 0 to 200 mL/min 120 mL/minute continuous arterial flow at an imposed constant systolic pressure (0-40 mmHg) flow regime | Provide either a higher capacity portal vein/hepatic artery perfusion pump and augmented electrical and structural systems or two complete and independent pumping systems based upon research outcomes. |
| Recirculating perfusion with 2 L volume | 1 L recirculating perfusate | The larger-sized liver cassette will accommodate 2 L perfusate |
| Liver positioned right side up or inverted. | Kidney cassette is not sized to accommodate the liver. | Design a liver cassette that would orient the liver as required |
| Pressure and flow monitor on inflow | Pressure and flow monitoring | No changes required |
| Oxygenation | Not required | Replace the pediatric oxygenator with an oxygen concentrator |
| Cannulate vein and hepatic arteries | Cannulate the renal artery | Provide cannulae |
| Fail-safe air bubbles exclusion inflow | Redundant bubble detectors and bubble divert | No changes required |
| Perfusate filtration to 20u | Perfusate filtration to 20u | No changes required |
| Fail-safe pump priming | Fail-safe pump priming | No changes required |
| Inversion survival | Reverts to static storage if inverted | Software modification for auto-restart |
| Two-man carry | 39 lbs fully loaded for a 24-hour transport. 29 lbs empty | Ergonomic evolution needed since the liver transporter is larger |
| Simplicity a plus | Human factors in design | Changes will be made as our user understanding evolves |

The LTR has maintained the original kidney transporter's architecture, electronic configuration and software packaging. Modifications to the pump controls may be needed in order to prevent the software shutting down when temperatures exceeded the original specifications of the design. This may be done, for example, by replacing a thermistor with a resistor with an equivalent 27 kOhm resistance.

The results of the comparison of oxygenated HMP liver functions at 4-6° C. and 12-14° C. for porcine livers were compared. All livers were flushed with Belzer's solution and placed on ice for 2 h during transport and preparation for studies. After HMP mean liver weights stayed relatively constant (+2.2%) for 12 h of HMP. Outflow solutes ($Na^+$, $K^+$ and $Ca^{++}$) varied little with perfusion time. A single 12-14° C. HMP liver exhibited a $Ca^{++}$ spike at 22 hours. Mean lactate levels were less than 4.5 mmol/L. Active oxygenation in both 4-6 and 12-14° C. HMP groups produced mean $pO_2$ ranges of 271-359 and 60-319 mmHg in the perfusate entering the liver, respectively, during long term HMP. The $pCO_2$ levels gradually increased to mean values of 13.9 and 25.2 mmHg (p<0.05), respectively. At the conclusion of the experimental HMP tests, the livers were tested on a normothermic circuit. HMP-treated livers functioned immediately during ex vivo testing and demonstrated excellent bile production.

Figure 4:
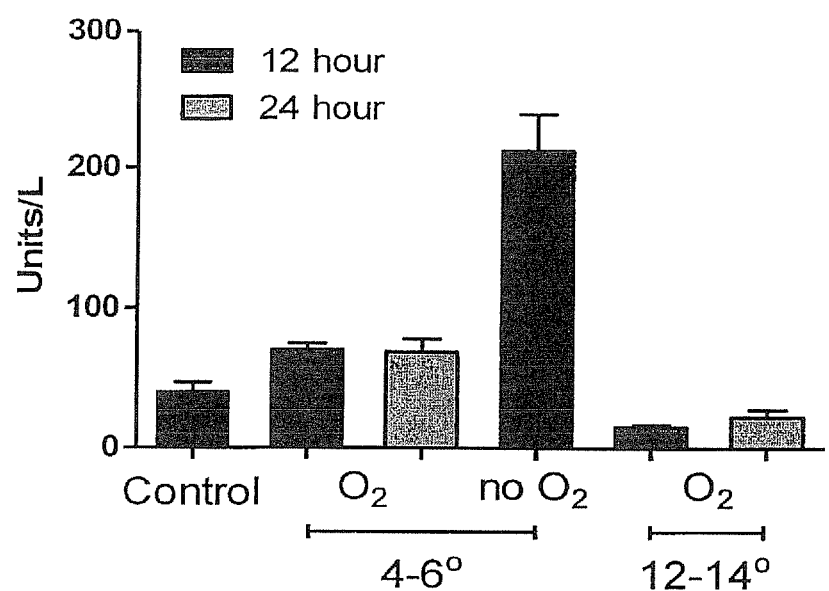
FIG. 4 is an illustration of results obtained with respect to ALT and depict that the ALT values for the 12-14° C. and 4-6° C. oxygen groups were significantly different compared with the controls and each other.

Significantly less Factor V production, greater indocyanine green clearance, and less blood urinary nitrogen concentrations were observed in both 12 h HMP groups (p<0.05) compared with the controls. Decreased Factor V was the only function that was worse than fresh controls in the HMP groups. The ICG clearance was better in the HMP groups. Bilirubin kinetics was perturbed in all HMP groups compared with controls, however the peak concentrations achieved in the 12 h HMP groups were not significantly different, while the 22 hour 12-14° C. HMP group was significantly less than the control group (p<0.05). Histopathology revealed no differences. All groups became edematous and trapped erythrocytes during testing by normothermic perfusion suggesting that adding inhibitors of vasoconstriction and reperfusion injury during HMP and/or reperfusion may have significant benefits. The studies of FIG. 4 demonstrate a statistically significant increase in ALT during normothermic blood perfusion after HMP without oxygen (200 U/L) compared with <100 U/L in all other groups (FIG. 4, P<0.05 by both T-test and ANOVA for all comparisons).

The ALT values were significantly increased and significantly decreased for the 4-6° C. and 12-14° C. oxygenated groups, respectively. The reduction in ALT values may be due to secretion of ALT during 12-14° C. HMP due to a higher metabolic rate compared with 4-6° C. HMP. Significant changes in bile production, LDH, TNF-α, IL-8, β-gal, and albumin were observed versus either fresh livers and/or HMP livers with oxygen (FIG. 5). In only one case, TNF-α, were the HMP oxygenated groups also significantly different (FIG. 5E). The studies performed indicate that TNF-α levels decrease with time from procurement in all study groups and that both SCS and HMP±$O_2$ livers demonstrate similar decreases.

In the methods of the present disclosure, oxygenation may be accomplished by employing an oxygenator that does not require tanked gases. For example, the methods of the present disclosure may be practiced with a compressed gas-free electrochemical oxygen concentration system in the LTR.

Experimental Design

Four groups of five animals (20 pigs in all) will be used as liver donors. The order of experimental group procedures will be randomized. In group 1 five control 12 hour 4-6° C. HMP livers will be studied with a target $pO_2$ of 300 mmHg venous circulation employing tanked gas. In groups 3-4 12 hour HMP livers will be studied at target $pO_2$ of 100, 200 and 300 mmHg employing the electrochemical oxygen concentrator. The lowest target $pO_2$ that produces overall results from the testing (with respect to the monitored biomarkers) described below that are equivalent or better than the controls may be selected for use for this type of organ in the future.

Materials and Methods

Liver Procurement:

For organ harvest, livers will be isolated from outbred pigs, weighing 25-30 kg. The animals will be weighed and pre-anesthetized with a mixture of ketamine (22 mg/kg), acepromazine (1.1 mg/kg) and atropine (0.05 mg/kg) given IM. After establishing an ECG, the pigs will be intubated, and placed on isoflurane anesthesia at 1.5-2%. The pigs will be anticoagulated with heparin (400 IU/kg, IV). A midline incision is made from the top of the sternum to the pubis. The chest will be opened to allow access to clamp off the dorsal aorta and the inferior vena cava in the thorax. After cannulation of the abdominal dorsal aorta the inferior vena cava will be cut above the diaphragm. The pig will be euthanized by exsanguination under anesthesia and the liver will be perfused with 3 L of Lacatated Ringers. The liver will be removed with care, weighed, cannulated and SCS on ice in UW solution for 2 hours. It will then be flushed with lactated Ringers and then placed in a transporter cassette for perfusion. The donor's heparinized blood will be collected for use in the perfusate during post-preservation normothermic evaluation.

Hypothermic Machine Perfusion:

The LTR will be completely pre-equipped and ready to receive the liver. This study will employ Belzer's Machine Perfusion Solution, which is currently used clinically for kidney perfusion as the liver ex-vivo hypothermic perfusion solution. After priming the LTR, the perfusion solution will be delivered at a steady-state hypothermic temperature (4-6° C.) and the pressure regime will be established. The organ cassette with the afferent flow circuit tubing and solution filters will be in place. Disposable 20 μm sterile filters will be used to maintain the sterility of the perfusate and retain residual red blood cells. The livers will be continuously perfused, for 12 h or longer depending upon the specific aim being tested, at 4-6° C. and at a constant pressure resulting in flow rates of 0.4 and 0.1 ml/min/g liver through the portal vein and hepatic artery, respectively. It is our experience that a constant flow system results in a more homogeneous flow pattern during perfusion. Through the LTR electronic controller and computer integrated system, organ bath temperature, perfusion pressure and flow rate will be monitored and recorded in real time. Medical grade 100% $O_2$ will be equilibrated with the perfusion solution to elevate its $pO_2$ to 300 mmHg, prior to entering the liver. During perfusion, if necessary, the used filters will be discarded and replaced with new ones. Flow circuit tubing will be completely replaced with a new one after every experiment. Organ cassettes and perfusion solution reservoirs will be meticulously cleaned and sterilized between experiments. Liver weights will be documented before and after perfusion.

Ex Vivo Normothermic Liver Assessment:

The perfusion circuit includes the transporter, a pediatric heat exchanger-oxygenator and peristaltic pump system without a blood filter. The heat exchanger is set to maintain the perfusate at 37° C. The gases (oxygen and air) are mixed to maintain physiological partial pressures of $CO_2$ and $O_2$ (typically 1 part oxygen to 3 parts air). The perfusate for the isolated perfusion system will be 2.5 L of Krebs-Henseleit Buffer with 25-30% washed red blood cells. The circuit will be primed prior to reperfusion and pH and $pCO_2$ will be adjusted to normal physiological range. The liver is then placed in the perfusion circuit and tested for >3 hours. The transporter allows constant pressure settings and flow is adjusted to the desired pressure. The pressure in the portal vein (PV) is set to 15 mmHg and in the hepatic artery (HA) to 65 mmHg. Typically the flow rate through the PV is 1 ml/min/g liver and HA is 0.25 ml/min/g liver. Perfusate samples for $pCO_2$, $pO_2$, pH and osmolarity will be analyzed immediately and samples will be frozen in liquid nitrogen for other assays. Oxygen consumption will be calculated according to Fick's principle. Samples will be collected every 30 minutes.

Analytical Techniques

The analyses fall into 3 categories; (A) those used to monitor the experimental HMP groups during hypothermic perfusion, (B) assays anticipated to provide success criteria compared with control static stored livers, and (C) liver enzyme, cytokine and function assays that may provide additional important information regarding liver damage and synthetic functions. Collected data comparing controls with 12 h HMP±$O_2$ two Group B assays (β-Gal and bile production) and three Group C assays (LDH, ALT and IL-8) have demonstrated significant differences for 12 h HMP without oxygenation (FIG. 5).

Group A: General Biochemical Analyses:

These analyses are done to determine whether interventions are required during perfusion. Shifts in $pCO_2$, $pO_2$, pH and osmolarity may require intervention to change oxygenation, buffering or electrolytes. Baseline perfusate samples will be collected from the organ bath prior to placing the liver in it. Analyses of $pCO_2$, $pO_2$, electrolytes ($Na^+$, $K^+$, $Ca^{++}$, $NH_4^{++}$) and metabolites (lactate, glucose, glutamine, glutamate) will employ a Bioprofile400 machine.

Group B: Critical End Point Assays for Evaluation of Graft Preservation Quality:

1) Metabolic acidosis and hypoglycemia,
2) Bile Production: Bile production and indocyanine green secretion (Koneru, B., Leevy, C., Klein, K., and Zweil, P. Clearance of indocyanine green in the evaluation of liver donors. *Transplantation*, 58: 729-731, 1994; Tsubono, T., Todo, S., and Jabbour, N. Indocyanine green elimination test in orthotopic liver recipients. *Hepatology*, 24: 1165-1171, 1996, which is incorporated herein by reference in its entirety) will be measured. 10 mg/L Indocyanine green will be premixed in the perfusate. Bile will be collected and weighed every 15 minutes for the first hour, and every one-half hour subsequently during normothermic reperfusion, The bile will be tested for indocyanine green secretion (780 nm) with a UV-visible light spectrophotometer (Beckman DU640, Fullerton, Calif.).

3) Kupffer Cell Activation: β-Galactosidase levels will measured fluorometrically in samples obtained at 15-30 minute intervals using a specific substrate, 4-methyl-umbelliferyl-galactoside, and detection of 4-methylumbelliferone formation.

4) Sinusoidal Endothelial Cell Function: Hyaluronic acid (HYA) clearance (Rao, P., Bronsther, O., Pinna, A., Demetris, A., Snyder, J., Fung, J., and Starzl, T. Prediction of early graft function by effluent levels of hyaluronic acid in clinical liver transplantation. *Transpl Proc,* 25: 2141-2142, 1993; Sudo, Y. S., Takaya, S., Kobayashi, M., Fukuda, A., Harada, O., Suto, T., Onozuka, N., and Suzuki, S. Assessment of graft viability using hyaluronic acid and adenosine triphosphate in orthotopic liver transplantation from non-heart-beating donors. *Transplantation Proceedings,* 32: 2114-2115, 2000, each of which is incorporated herein by reference in its entirety) is used extensively both clinically and experimentally to assess endothelial cell damage. Given that endothelial cell damage is implicated in cold preservation injuries, assessment of the sinusoidal endothelial cells will be an important indicator of graft function following preservation. HYA uptake will be assessed. 150 ug of HYA/L will be included in the perfusate and clearance will be assessed at 15-minute intervals during the first hour of rewarming and at 30 minute intervals for the remainder of the assessment period using an enzyme-linked binding protein assay kit (Corgenix Inc, Westminster, Colo.).

Group C) Other Assays:

Liver enzymes, lactate dehydrogenase and alanine aminotransferase, are commonly used indicators of hepatocellular damage. Both enzymes will be determined after the machine perfusion preservation period and during rewarming using colorimetric diagnostic kits (Sigma, St. Louis, Mo.). In addition the following liver function assays will be employed during the reperfusion period using established methods: Factor V production (Adham, M., Peyrol, S., Chevallier, M., Ducerf, C., Vernet, M., Barakat, C., De, L. R. E., Taibi, A., Bizollon, T., Rigal, D., Pouyet, M., and Baulieux, J. The isolated perfused porcine liver: assessment of viability during and after six hours of perfusion. *Transpl Int,* 10: 299-311, 1997; Russo, F., Bassanello, M., Senzolo, M., Cillo, U., and Burra, P. Functional and morphological graft monitoring after liver transplantation. *Clin Chim Acta,* 310: 17-23, 2001; Fischer, L., Sterneck, M., and Rogiers, X. Liver transplantation for acute liver failure. *Eur J Gastroenterol Hepatol,* 11: 985-990, 1999, each of which is incorporated herein by reference in its entirety), total bile bilirubin (Adham, (above); Krenn, C., Schafer, B., Berlakovich, G., Steininger, R., Steltzer, H., and Spiss, C. Detection of graft nonfunction after liver transplantation by assessment of indocyanine green kinetics. *Anesthesia and Analgesia,* 87: 34-36, 1998, each of which is incorporated herein by reference in its entirety) and urea production (Ohtake, 1991) using Sigma kits. In addition, cytokines, including IL-8, may be assessed using ELISA assays present in the literature.

Tissue biopsies will also be collected and fixed with 2% Sorenson's-buffered glutaraldehyde solution for approximately two hours and then processed for light microscopy. Staining for routine light microscopy will be with hematoxylin and eosin, toluidine blue, and Apoptag™ for detection of apoptotic cells. Histopathology will be assessed qualitatively on computerized images of liver tissue sections. At least three complete sections will be imaged per sample and the relative degree of apoptosis and pathologic changes determined using a semi-quantitative 4+ scale. In our experience the ability of the liver to maintain pH is important for normal function during perfusion. Electron microscopy will be used on selected specimens. Specific Aim 2: Evaluate whether the Vasosol formulation of antioxidants, metabolic substrates and Vasodilators has benefits during oxygenated HMP. Belzers Machine perfusate will be assessed with and without Vasosol for 12 hours of HMP. We will also extend these studies beyond 12 hours to determine the duration of HMP possible with retention of ex vivo functions.

Adding exogenous oxygen during HMP may risk oxidant damage. Methods of the present disclosure may employ Vasosol formulation. Besides antioxidants, this solution also contains vasodilators and metabolic substrates. The formulation for Vasosol per L is as follows:

L-prostaglandin E1-2 vials at 500 ug/mL; nitroglycerin −50 mg/10 mL; N-acetylcysteine −0.002 g/10 mL, min. vol. 10 mL; L-arginine−2.00 g/20 mL, min. vol. 10 mL; and alpha-ketoglutarate −0.002 g/10 mL, min. vol. 10 mL.

Screening of new biomarkers that may be predictive of organ function.

Tissue biopsies and perfusate will be collected at the beginning and end of each HMP experiment and during the ex vivo normothermic evaluation. RNA analyses will focus on markers associated with reperfusion injury and heat shock. Examples of biomarkers in the perfusate that will be investigated include a broader range of inflammatory biomarkers (such as interleukins and TNF-α), heat-shock proteins and reperfusion injury biomarkers observed in the literature. For example, in a recent paper, "The Value of Machine Perfusion Perfusate Biomarkers for Predicting Kidney Transplant Outcome" (Moers, 2010), which is incorporated herein by reference in its entirety, the authors conclude that "increased GST, NAG, or H-FABP concentrations during kidney HMP are an indication to adjust post-transplant recipient management. This study shows for the first time that perfusate biomarker measurements should not necessarily lead to organ discard. The methods of the present disclosure, allow for organ therapy decisions and/or the specific strategy (such as the perfusate composition, which may be a combination of a number of perfusate solutions) for preservation and/or sustaining, maintaining or improving the viability of the organs is selected based (at least in-part) on the quantitative and/or qualitative relationship (which may be based on one or more factors, such as concentration of a specific biomarker, or the mere detectable level of a particular biomarker versus the non-detectable level of a different biomarker) of one or more of the predetermined biomarkers that are being monitored (for a respective organ) such that the suspect marginal organ can be repaired or its viability returned to a state in which it is suitable for transplantation.

Materials and Methods

The tissue biopsies will stored in RNAlater (Qiagen) for 24 h and then stored frozen for future RNA isolation. Both the tissue samples and perfusate samples will be stored at −80° C. in our tissue bank until processing. The assays will be in addition to those utilized in Specific Aim 1 to evaluate organ function. New marker assays will be performed using enzyme-linked immunosorbent assays (ELISAs). RNA samples will be isolated from the liver biopsies. The extracted RNA will then be used to establish a gene expression fingerprint profile employing Affymetrix Gene Chip-based differential gene expression assays as well as parallel sequencing.

Experimental Design

A total of 36 adult domestic Yorkshire cross farm pigs weighing 25-30 kg will be used over the course of this Aim, 18 for liver procurement and 18 liver recipients. Daily blood samples will be collected from the recipients starting the day before transplant surgery and all the assays described above will be performed. Liver biopsies will be performed for histology, and histochemistry before transplant, 1 hour after reperfusion and at the conclusion of each experiment. Serum and biopsy samples will also be banked for analyses including gene arrays guided by the results of earlier aims.

Materials and Methods

Transplantation Organ Harvest:

Livers and will be isolated from outbred pigs, weighing 25-30 kg. The animals will be weighed and pre-anesthetized with a mixture of ketamine (22 mg/kg), acepromazine (1.1 mg/kg) and atropine (0.05 mg/kg) given IM. After establishing an ECG, the pigs will be intubated, and placed on isoflurane anesthesia at 1.5-2%. The pigs will be anticoagulated with heparin (400 IU/kg, IV). A midline incision is made from the xiphoid process to the pubis. The falciform, left triangular, and gastrohepatic ligaments are divided. The portohepatic is dissected free from the peritoneum to the level of the pancreas. This will expose the portal vein and hepatic artery. The pig will be euthanized by exsanguination under anesthesia. In situ flushing of the liver is performed using ~3 L of ice-cold Lactated Ringers solution. The caudal vena cava is dissected free of its peritoneal attachments from the level of the adrenal glands cranially through the diaphragm. Generous lengths of these vessels will be dissected to facilitate attachment of the perfusion device tube set. The common bile duct, hepatic artery, portal vein and vena cava will then be divided and ligated. The livers will be stored in UW solution at +4° C. during transport to the laboratory for further evaluation.

Organ Implantation:

The recipient is prepared in a manner similar to the transplant organ donor animal and the organ implant method is described above. The transplant recipients will be immunosppressed and studied daily using a panel of transplant function blood biomarkers. The transplant recipients will be immunosuppressed and studied daily using a panel of transplant function blood biomarkers and coagulation assays for 7 days. The assays using a Piccolo General Chemistry disc will include ALT, albumin, alkaline phosphatase, amylase, aspartate aminotransferase, glucose, total bilirubin, total protein, blood urea nitrogen and uric acid in addition to the BioProfile400 assays described earlier and ELISAs. Biopsies will be assessed using histochemistry, routine histology and gene arrays. Gross pathology with particular attention to encephalopathy will be assessed at the conclusion of the study post euthanasia. Data collected from any of the above experiments may be used to form a data record by uploading to a processor compiled data comprising: data relating to one or more qualitative and/or quantitative relationships of one or more predetermined biomarkers while organs were preserved, transported and/or stored in at least one device selected from an organ transporter, perfusion apparatus, cassette, and organ diagnostic apparatus; and events occurring while organs were transported and/or stored in at least one device selected from an organ transporter, perfusion apparatus, cassette, and organ diagnostic apparatus, and data relating to outcomes of transplantation of said organs. Thereafter, using the same processor or a different processor, transport, storage, and/or preservation parameters of the at least one device or a different device may be determined, based on the data record, for maintaining viability of at least one other organ.

While the invention has been described in conjunction with specific embodiments thereof, it is evident that many alternatives, modifications and variations may be apparent to those skilled in the art. Accordingly, the embodiments of the invention as set forth herein are intended to be illustrative, not limiting. Various changes may be made without departing from the spirit and scope of the invention.

What is claimed is:

1. A method of determining parameters for maintaining viability of a liver or a kidney in at least one device selected from an organ transporter, perfusion apparatus, cassette, and organ diagnostic apparatus, the method comprising:

procuring a donor liver or a donor kidney, wherein the procured donor liver or kidney is diseased or injured and in need of treatment in order to be suitable for transplantation;

forming a data record by uploading to a processor compiled data comprising:

data relating to one or more qualitative and/or quantitative relationships of one or more predetermined biomarkers while livers or kidneys were preserved, transported and/or stored in at least one device selected from an organ transporter, perfusion apparatus, cassette, and organ diagnostic apparatus; and events occurring while livers or kidneys were transported and/or stored in at least one device selected from an organ transporter, perfusion apparatus, cassette, and organ diagnostic apparatus, and data related to outcomes of transplantation of said livers or kidneys;

wherein data relating to one or more qualitative and/or quantitative relationships of one or more predetermined biomarkers while the livers or kidneys were preserved, transported and/or stored include:

perfusion data from an oxygenated perfusate acquired while the livers or kidneys were preserved, transported and/or stored under hypothermic conditions in the range of from 4 to 6° C. with the perfusate being oxygenated using an oxygenator with a target $pO_2$ of 300 mmHg, the perfusion data comprising a$pO_2$ of the perfusate, a stability of the $pO_2$ in the perfusate, a glucose concentration of the perfusate, a stability of the glucose concentration in the perfusate, a pH of the perfusate, and a stability of the pH in the perfusate, a metabolic rate of the liver or kidney while the temperature of the liver or kidney is in the range of from 4 to 6° C. and oxygenation of the perfusate is performed using an oxygenator with a target $pO_2$ of 300 mmHg, and stability of a metabolic rate while the temperature of the liver or kidney is in the range of from 4 to 6° C. and oxygenation of the perfusate is performed using an oxygenator with a target $pO_2$ of 300 mmHg, an oxygen consumption rate, a stability of the oxygen consumption rate, a glucose consumption rate, and a stability of the glucose concentration, the relationship of the oxygen partial pressure ($pO_2$), the stability of the $pO_2$, the oxygen consumption rate, and the stability of the oxygen consumption rate to a perfusion parameter or condition while livers or kidneys were transported and/or stored in at least one device selected from an organ transporter, perfusion apparatus, cassette, and organ diagnostic apparatus, and events and/or conditions occurring while at least one liver or kidney is present in at least one of an organ transporter, perfusion apparatus, cassette, and/or organ diagnostic apparatus;

performing a database inquiry of the compiled information contained in the data record to select a set of biomarkers to monitor for the procured donor liver or kidney;

perfusing the procured donor liver or kidney with a perfusion solution supplied via a perfusion apparatus to treat the procured donor liver or kidney, where an organ therapy regimen, perfusion conditions and the perfusion solution are selected based on an initial assessment of the selected set of biomarkers that is compared to normative ranges for that organ that are established based on the compiled information contained in the data record; and using the processor or a different processor to determine parameters of the perfusion apparatus or at least one different device, based on the data record, for maintaining the viability of the treated liver or kidney.

2. The method of claim 1, wherein the treated liver or kidney is determined to be unsuitable for transplantation because the therapy regimen did not result in the treated liver or kidney having a predetermined level of viability.

3. The method of claim 2, further comprising employing hypothermic perfusion to reduce the metabolic rate of the treated liver or kidney determined to be unsuitable for transplantation, and preserving the treated liver or kidney determined to be unsuitable for transplantation for days or weeks before performing for further medical research and testing on the treated liver or kidney determined to be unsuitable for transplantation.

\* \* \* \* \*